US012669148B2

(12) United States Patent
Mizutani et al.

(10) Patent No.: US 12,669,148 B2
(45) Date of Patent: Jun. 30, 2026

(54) GUIDE DEVICE

(71) Applicant: THK CO., LTD., Tokyo (JP)

(72) Inventors: Yuichi Mizutani, Tokyo (JP); Marina Takeda, Tokyo (JP); Kazutoshi Harima, Tokyo (JP); Minami Tsuiki, Tokyo (JP)

(73) Assignee: THK CO., LTD., Tokyo (JP)

( * ) Notice: Subject to any disclaimer, the term of this patent is extended or adjusted under 35 U.S.C. 154(b) by 61 days.

(21) Appl. No.: 18/714,412

(22) PCT Filed: Nov. 28, 2022

(86) PCT No.: PCT/JP2022/043741
  § 371 (c)(1),
  (2) Date: May 29, 2024

(87) PCT Pub. No.: WO2023/100797
  PCT Pub. Date: Jun. 8, 2023

(65) Prior Publication Data
  US 2025/0020162 A1      Jan. 16, 2025

(30) Foreign Application Priority Data
  Dec. 1, 2021    (JP) ................................ 2021-195280

(51) Int. Cl.
  *F16C 29/00*          (2006.01)
(52) U.S. Cl.
  CPC .......... *F16C 29/004* (2013.01); *F16C 29/001* (2013.01)
(58) Field of Classification Search
  CPC ...... F16C 29/06; F16C 29/004; F16C 29/001; F16C 2226/60; F16C 29/005
  See application file for complete search history.

(56) References Cited

U.S. PATENT DOCUMENTS

2015/0043990 A1      2/2015 Endres et al.
2016/0341247 A1 *  11/2016 Kano .................. F16C 29/0647

FOREIGN PATENT DOCUMENTS

DE      102013108650 A1      2/2015
JP          2001280413 A  * 10/2001    ............ F16C 29/005
(Continued)

OTHER PUBLICATIONS

Extended (Supplementary) European Search Report dated Mar. 3, 2025; issued in counterpart EP Application No. 22901230.7. (9 pages).

(Continued)

*Primary Examiner* — John Olszewski
*Assistant Examiner* — Aimee Tran Nguyen
(74) *Attorney, Agent, or Firm* — WHDA, LLP

(57) ABSTRACT

A guide device is equipped with a rail having a first surface in contact with a mounting surface, a second surface opposite the first surface, a through hole penetrating between the first surface and the second surface, and a recessed portion that is an opening on a first surface side of the through hole and is formed to be recessed from the first surface toward the second surface, wherein the recessed portion includes a third surface that is a surface orthogonal to the first surface and orthogonal to a width direction of the rail; the recessed portion receives an eccentric part that rotates eccentrically with respect to a reference axis orthogonal to the mounting surface to apply a force to the third surface in the width direction of the rail; and the through hole has a diameter shorter than a length of the recessed portion in the width direction.

6 Claims, 29 Drawing Sheets

(56)     References Cited

FOREIGN PATENT DOCUMENTS

| JP | 2002005162 A | * | 1/2002 | ............ | F16C 29/065 |
| JP | 2002-227810 A | | 8/2002 | | |
| JP | 2003127037 A | * | 5/2003 | ............ | F16C 29/004 |

OTHER PUBLICATIONS

International Search Report dated Feb. 7, 2023, issued in counterpart International Application No. PCT/JP2022/043741. (2 pages).

* cited by examiner

[Fig. 1]
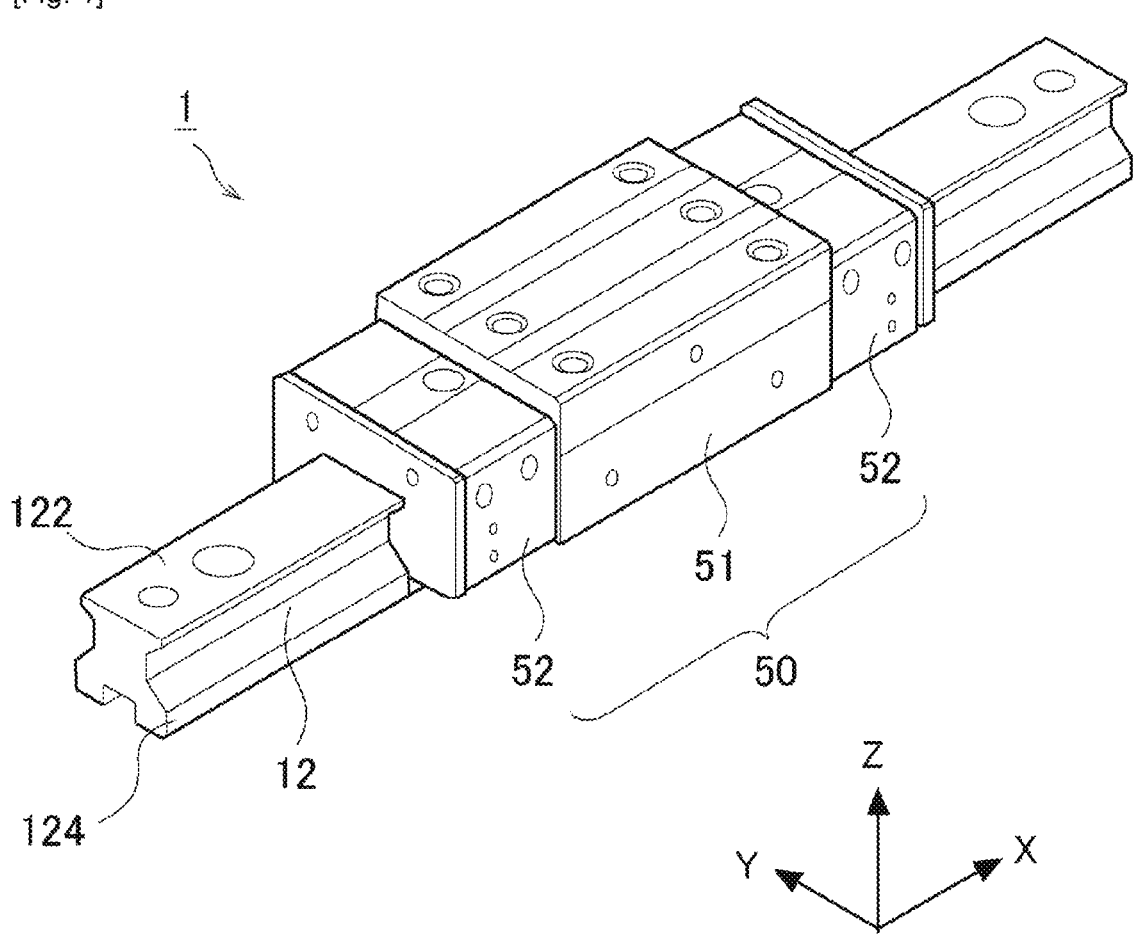

[Fig. 2]
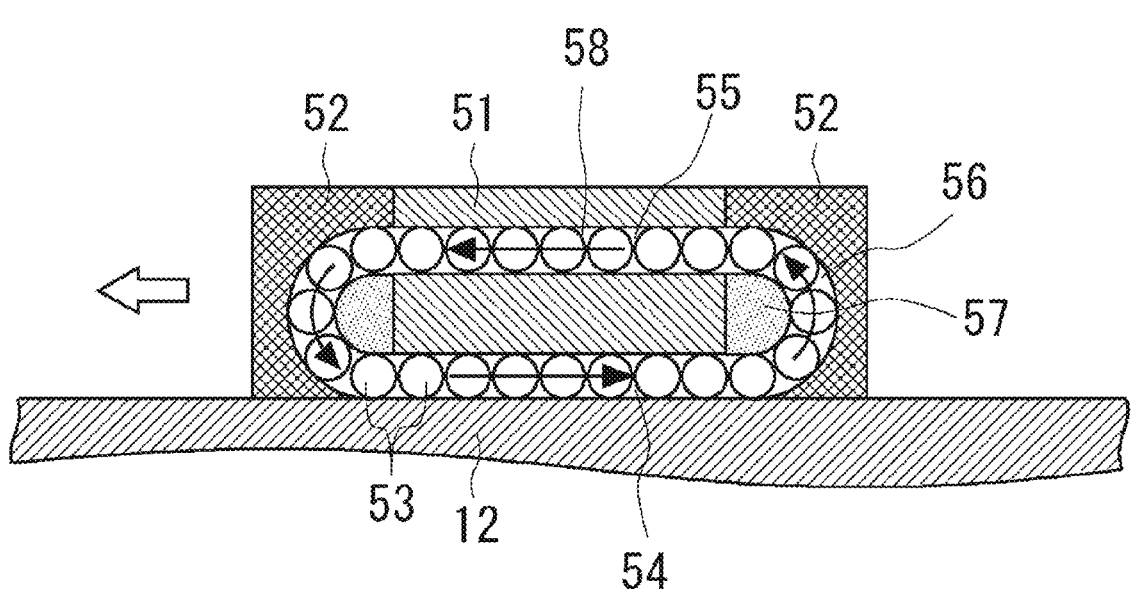

[Fig. 5]
1
12B          12A
A          B2          A
10B    11B    B1    11A    10A
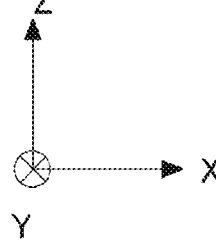

[Fig. 6]
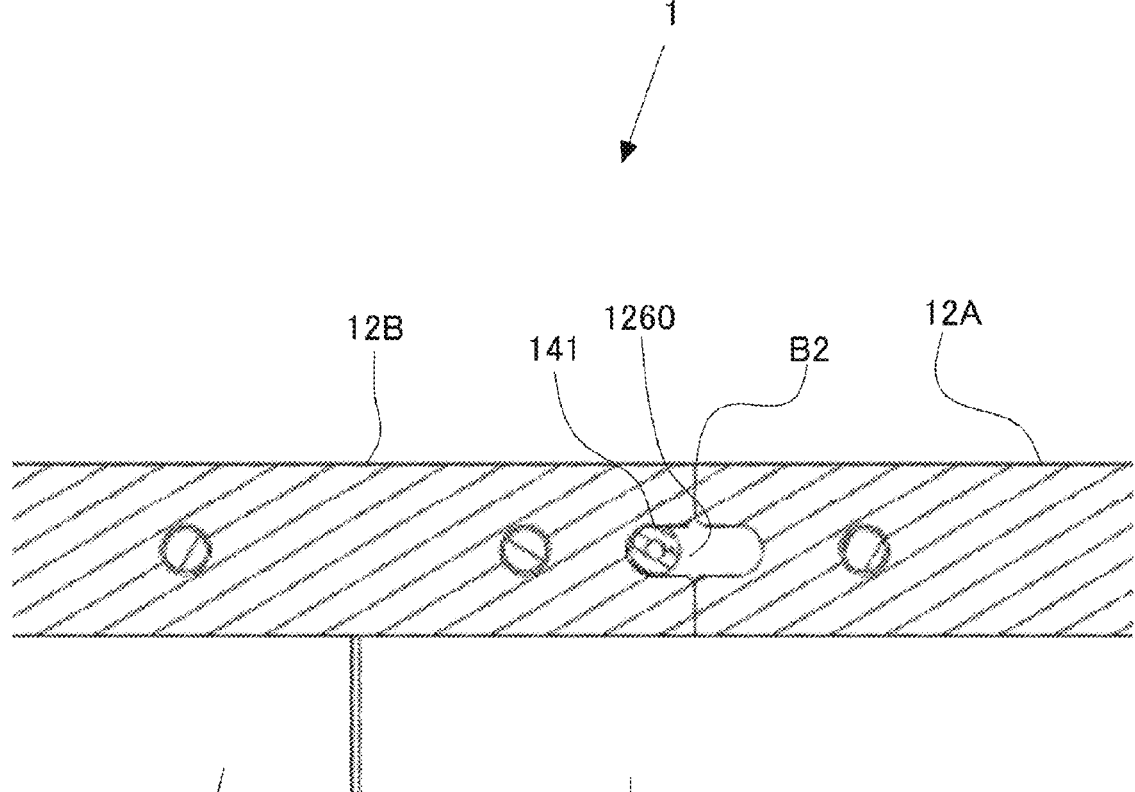
A-A CROSS SECTION

[Fig. 7]
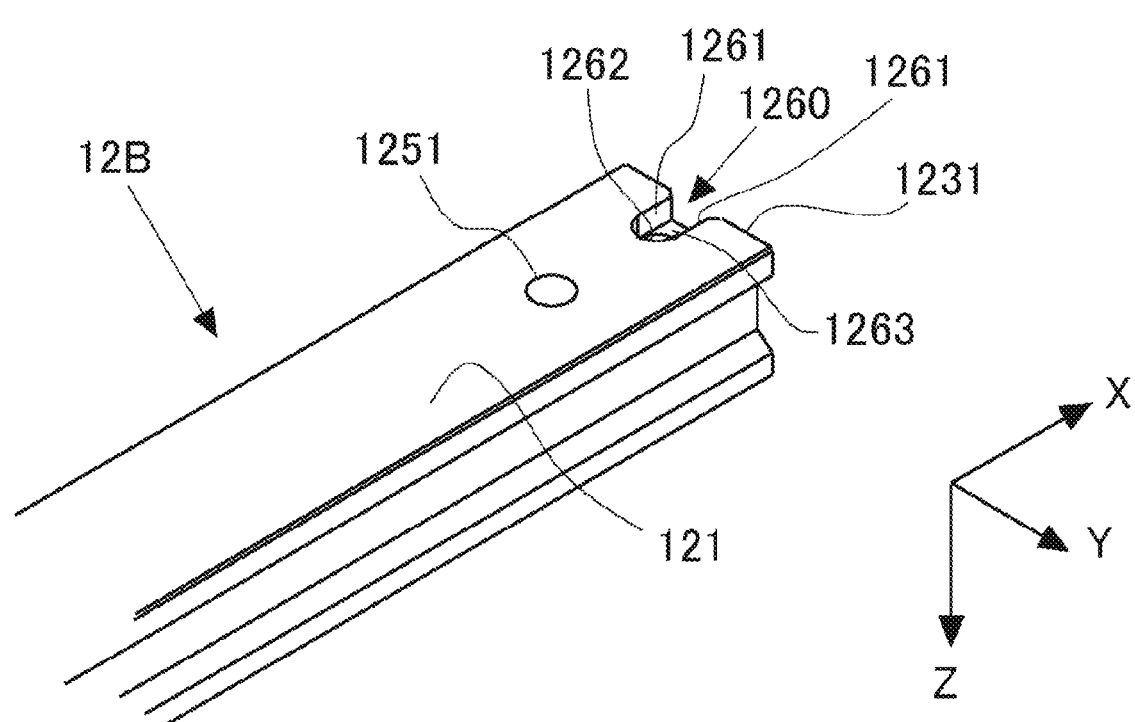

[Fig. 8]
142
1411
1262
1261
141
1261
A2     A1
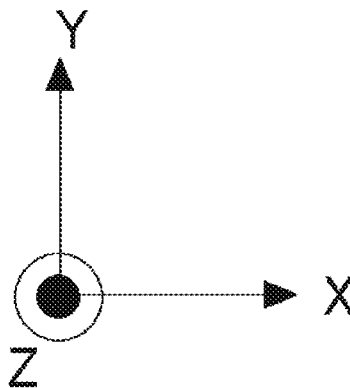

[Fig. 9]
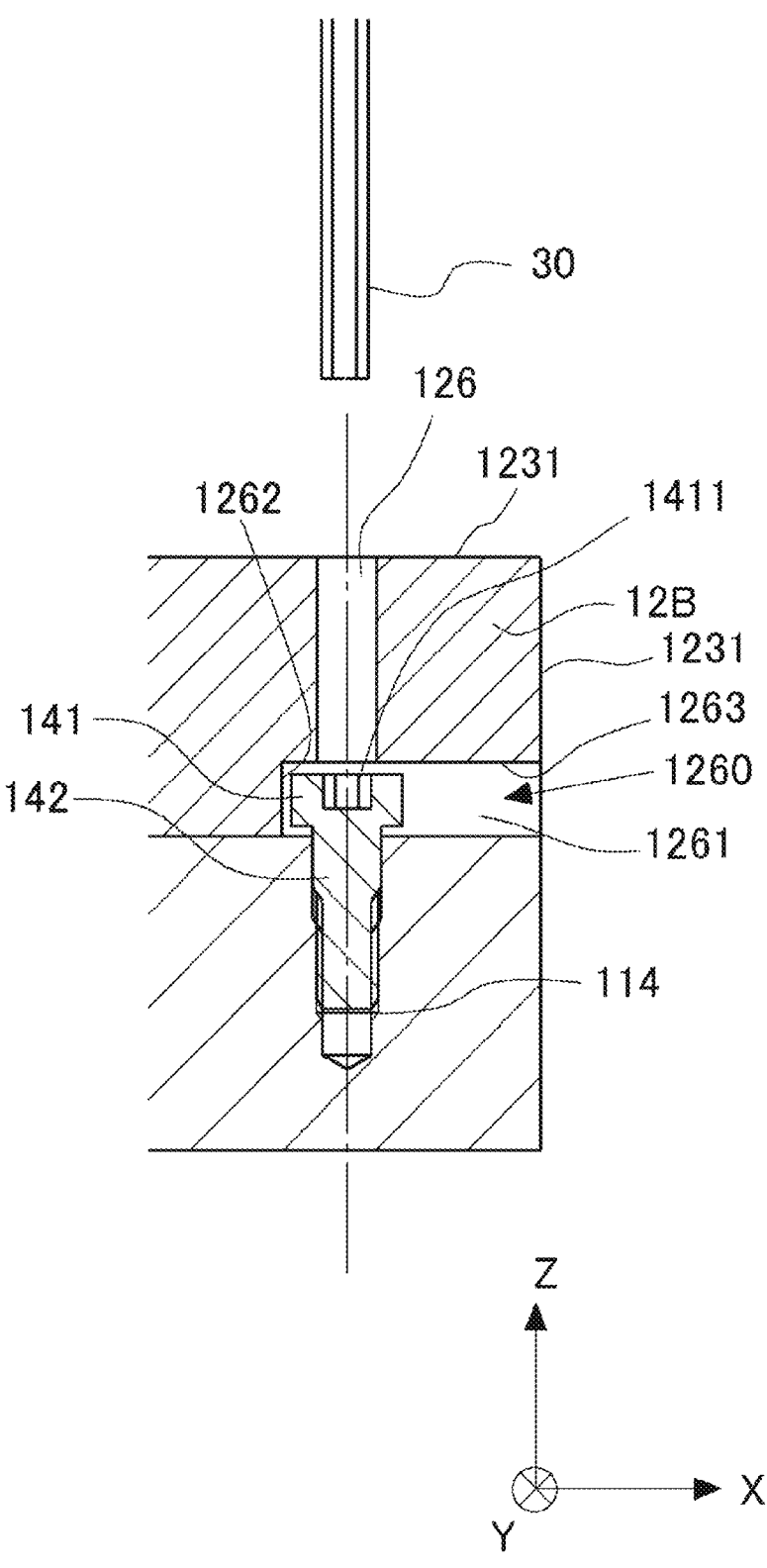

[Fig. 10]
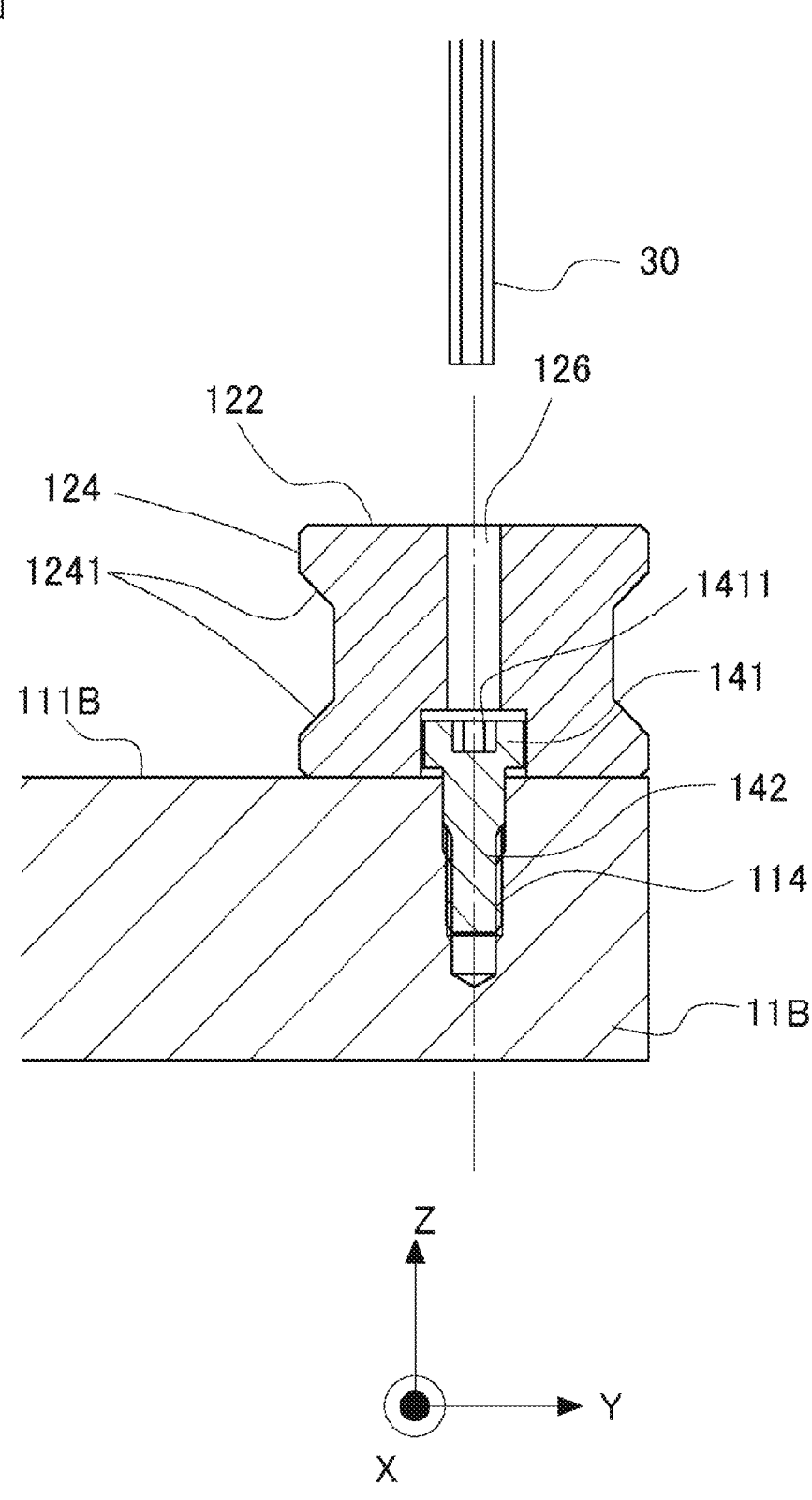

[Fig. 11]
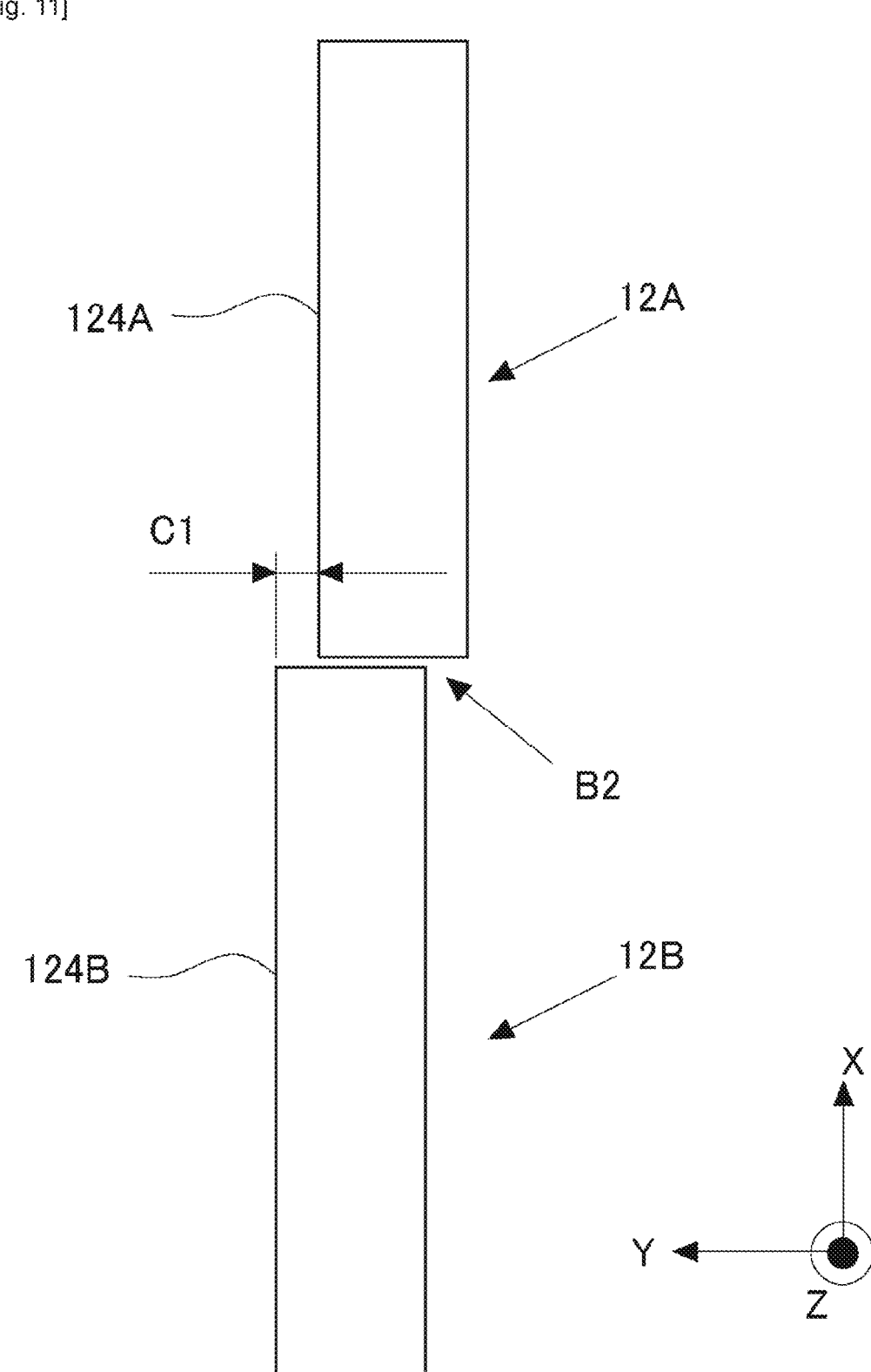

[Fig. 12]
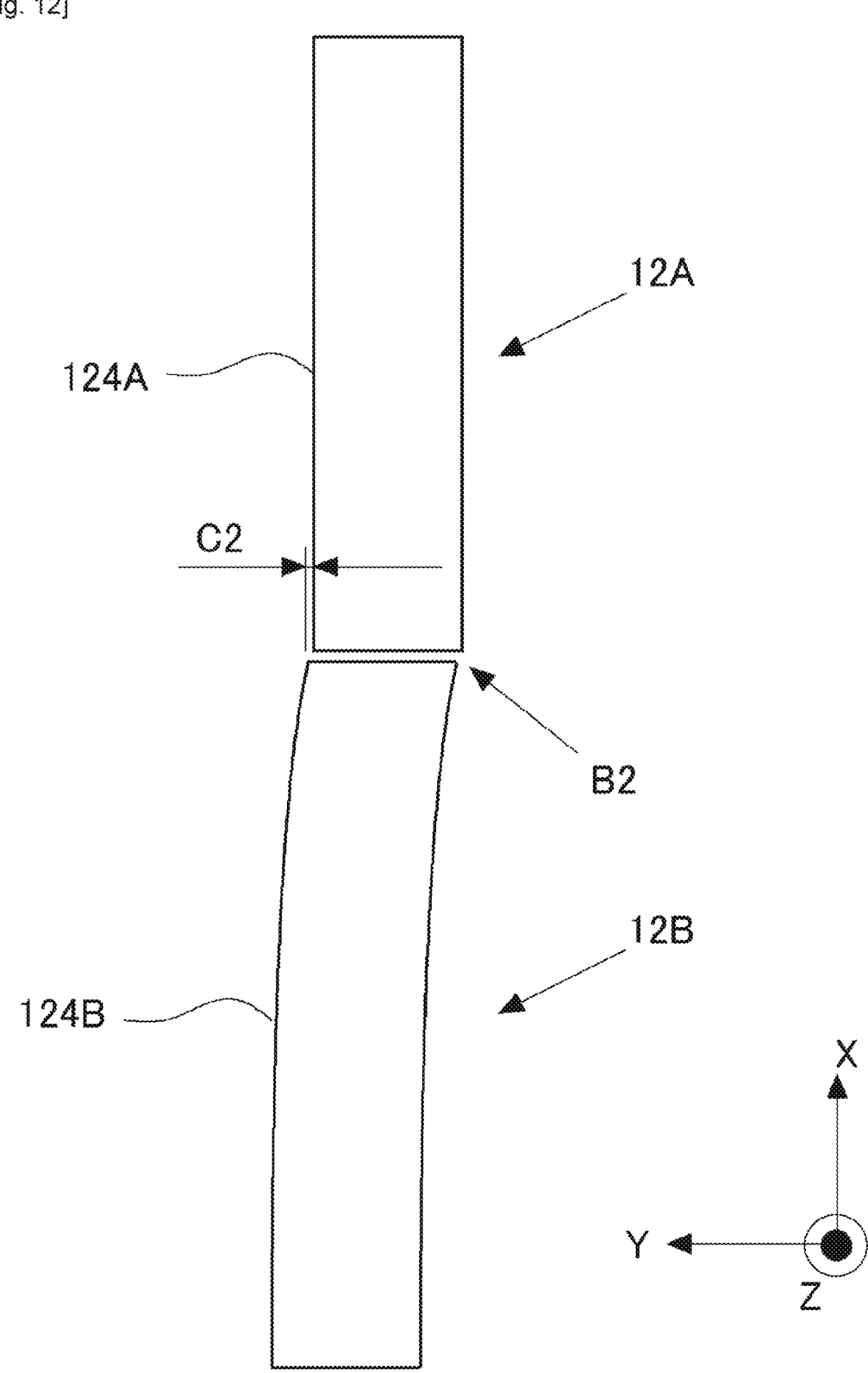

[Fig. 13]

[Fig. 14]
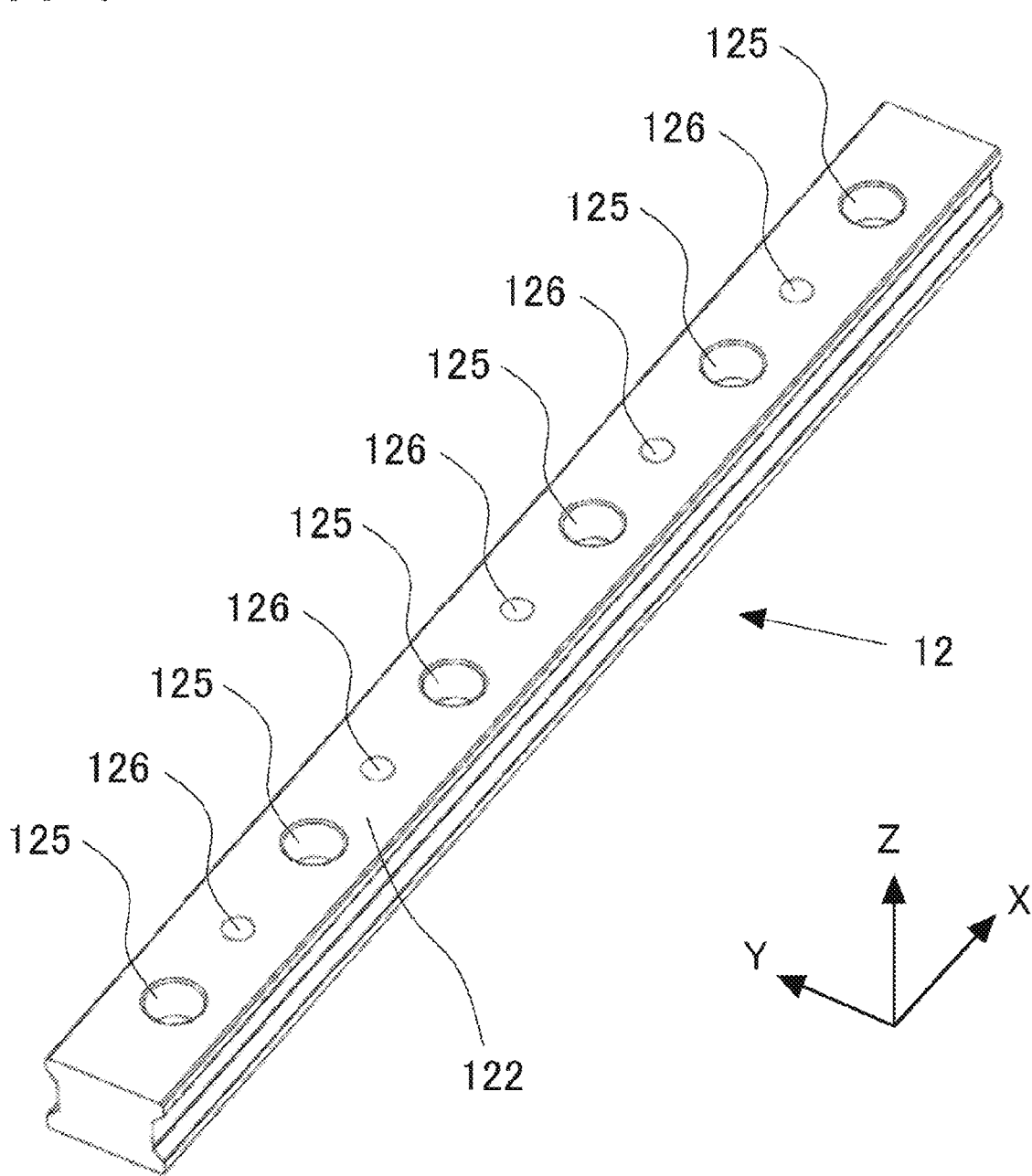

[Fig. 15]
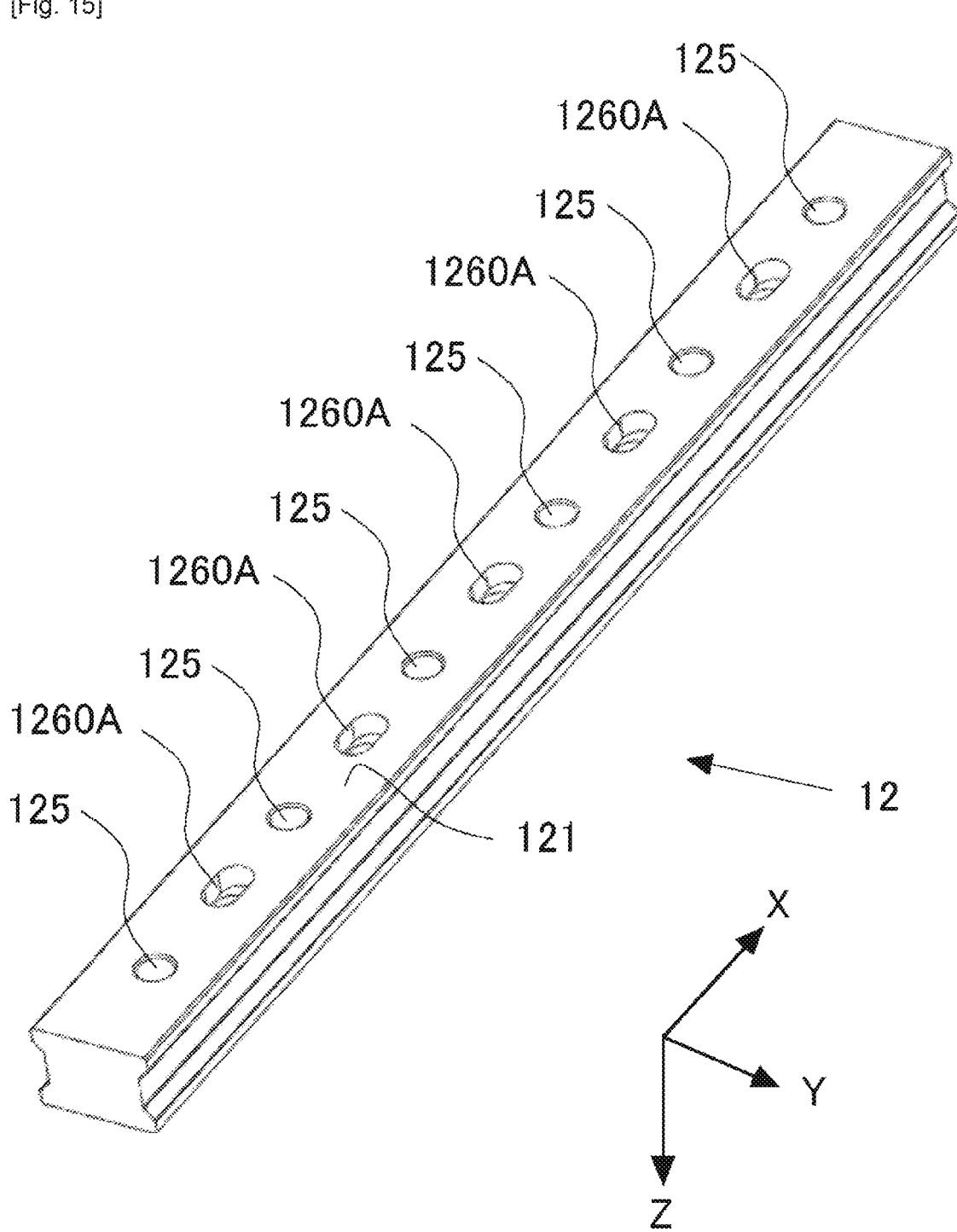

[Fig. 16]
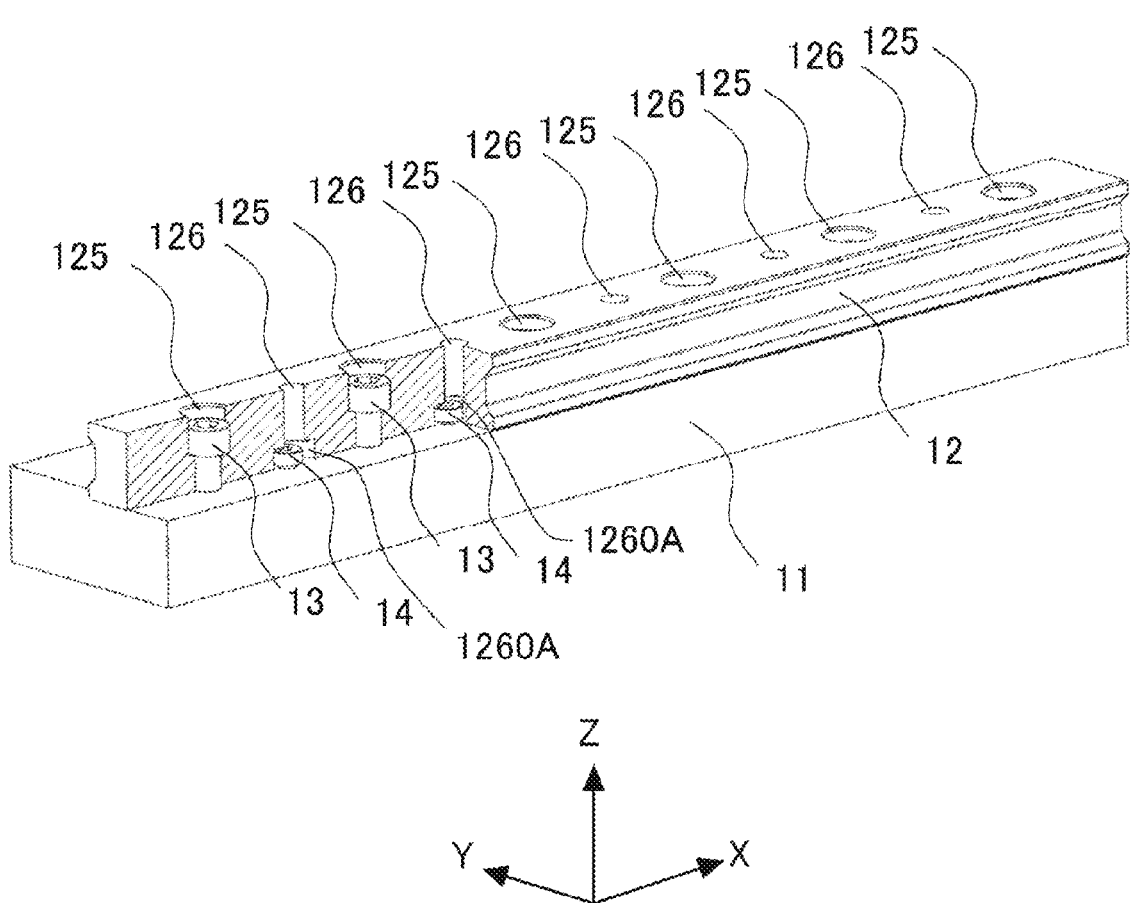

[Fig. 17]
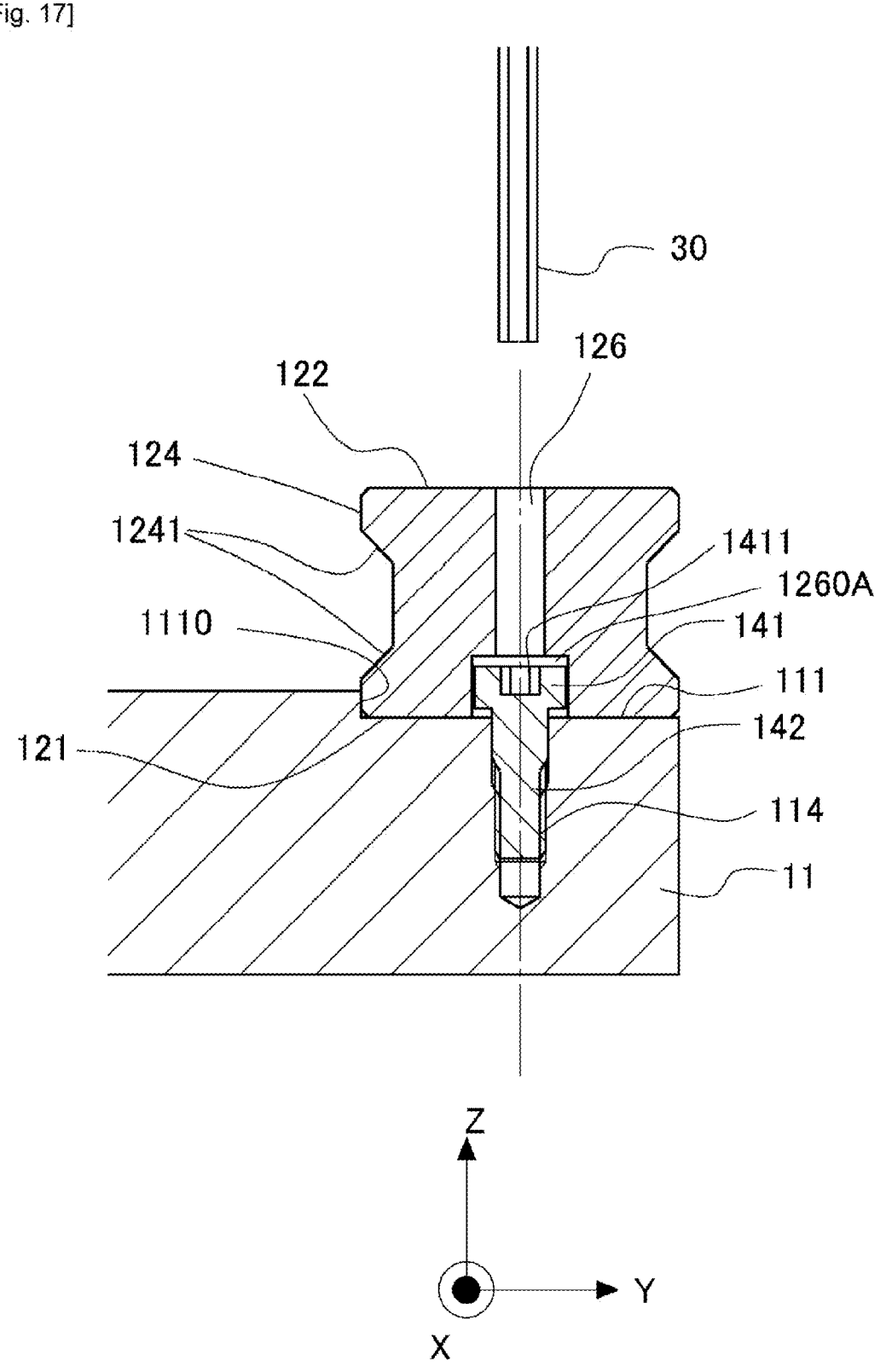

[Fig. 18]
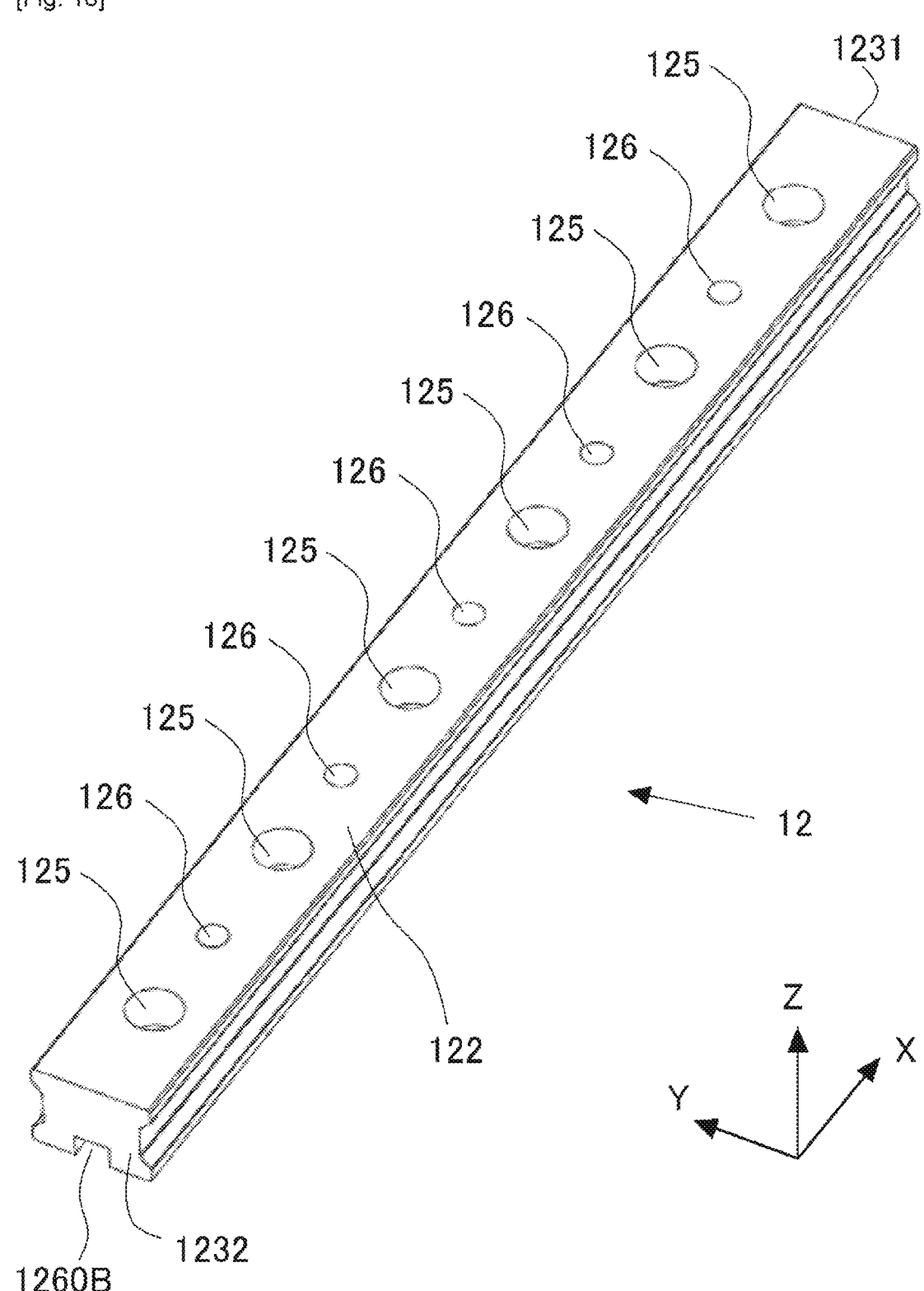

[Fig. 19]
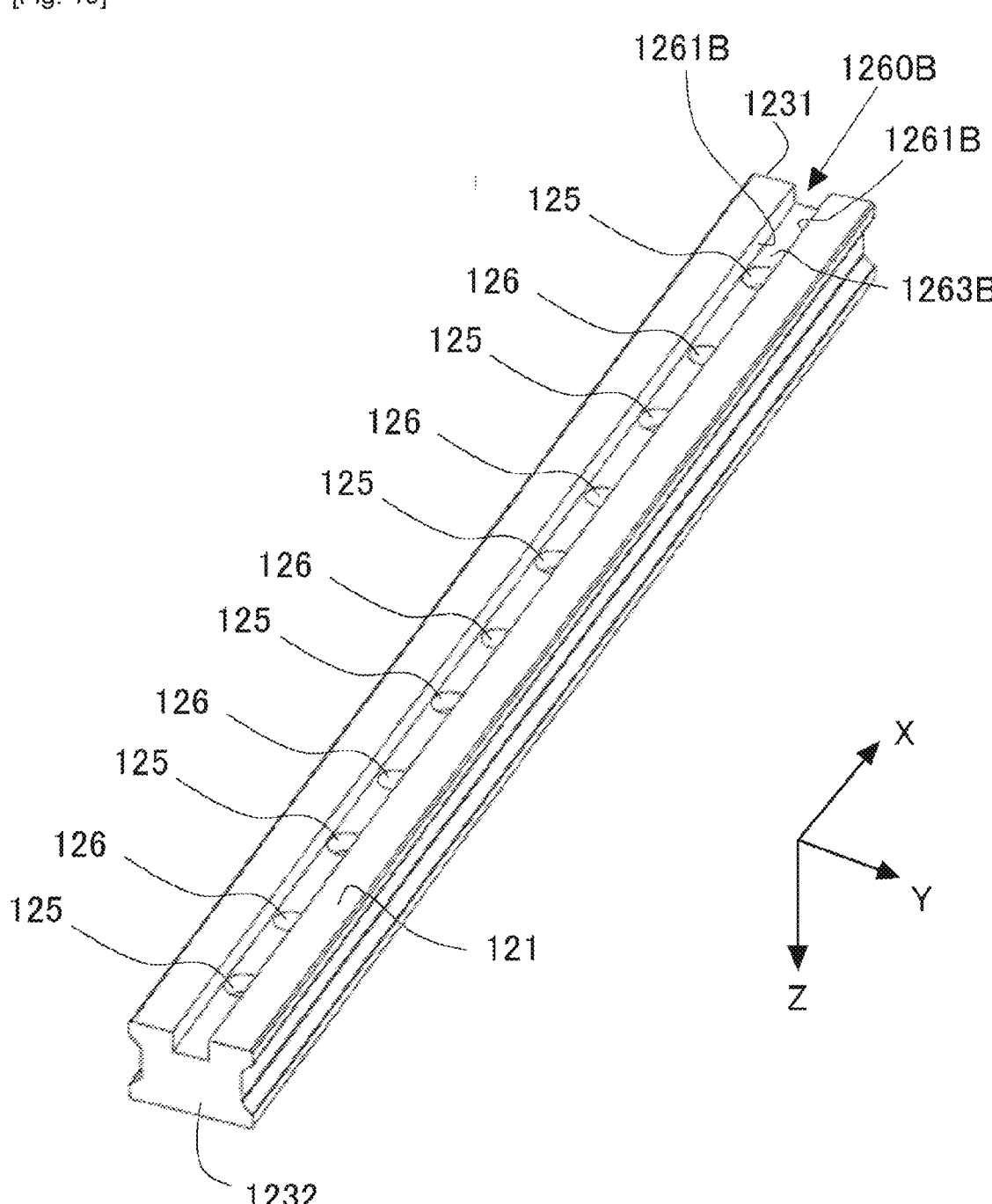

[Fig. 23]
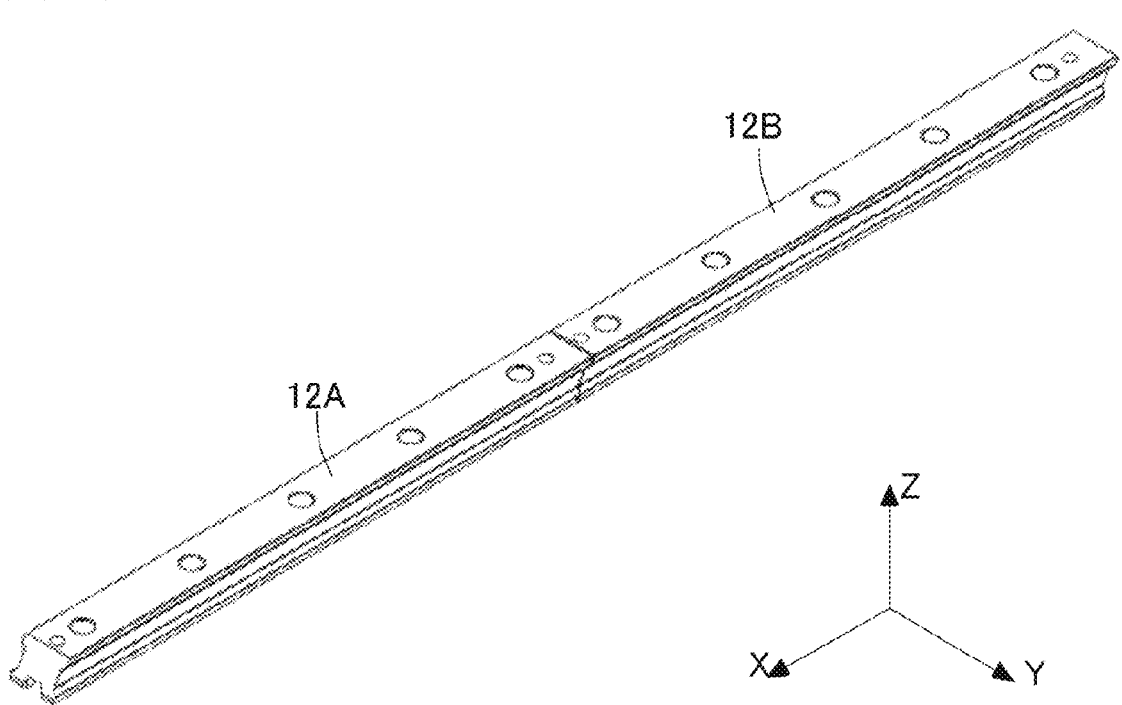

[Fig. 24]
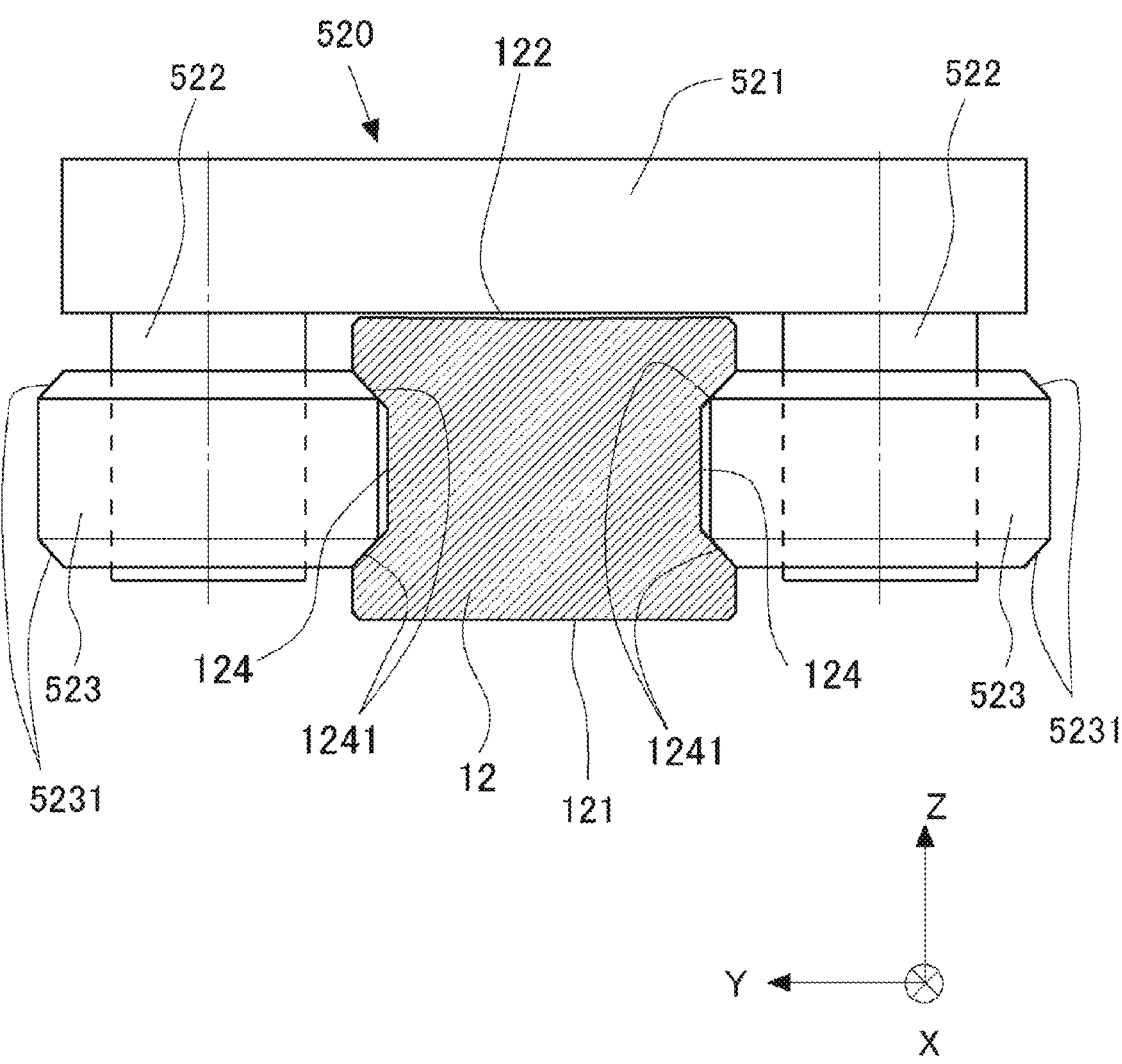

[Fig. 25]
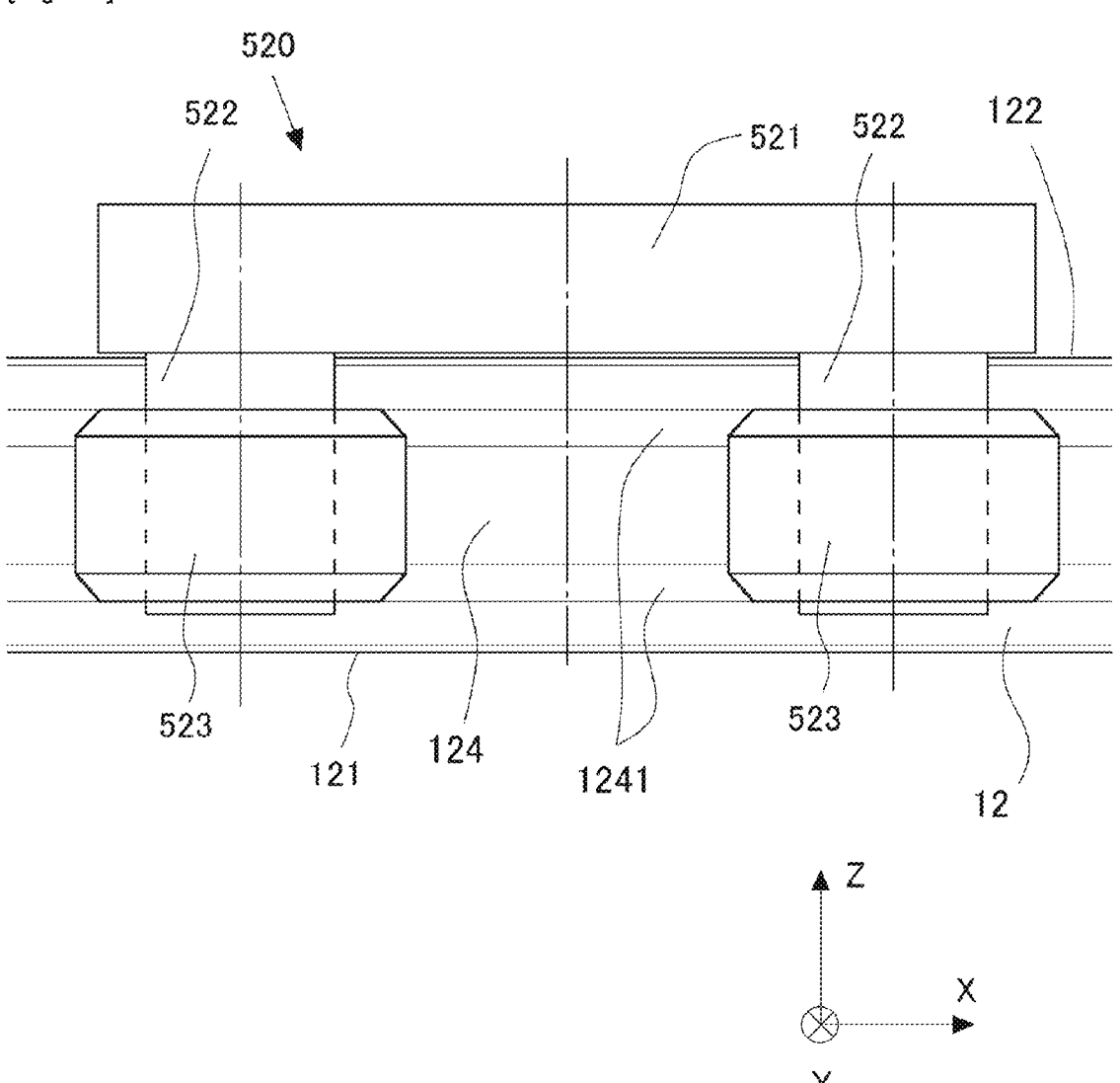

[Fig. 26]
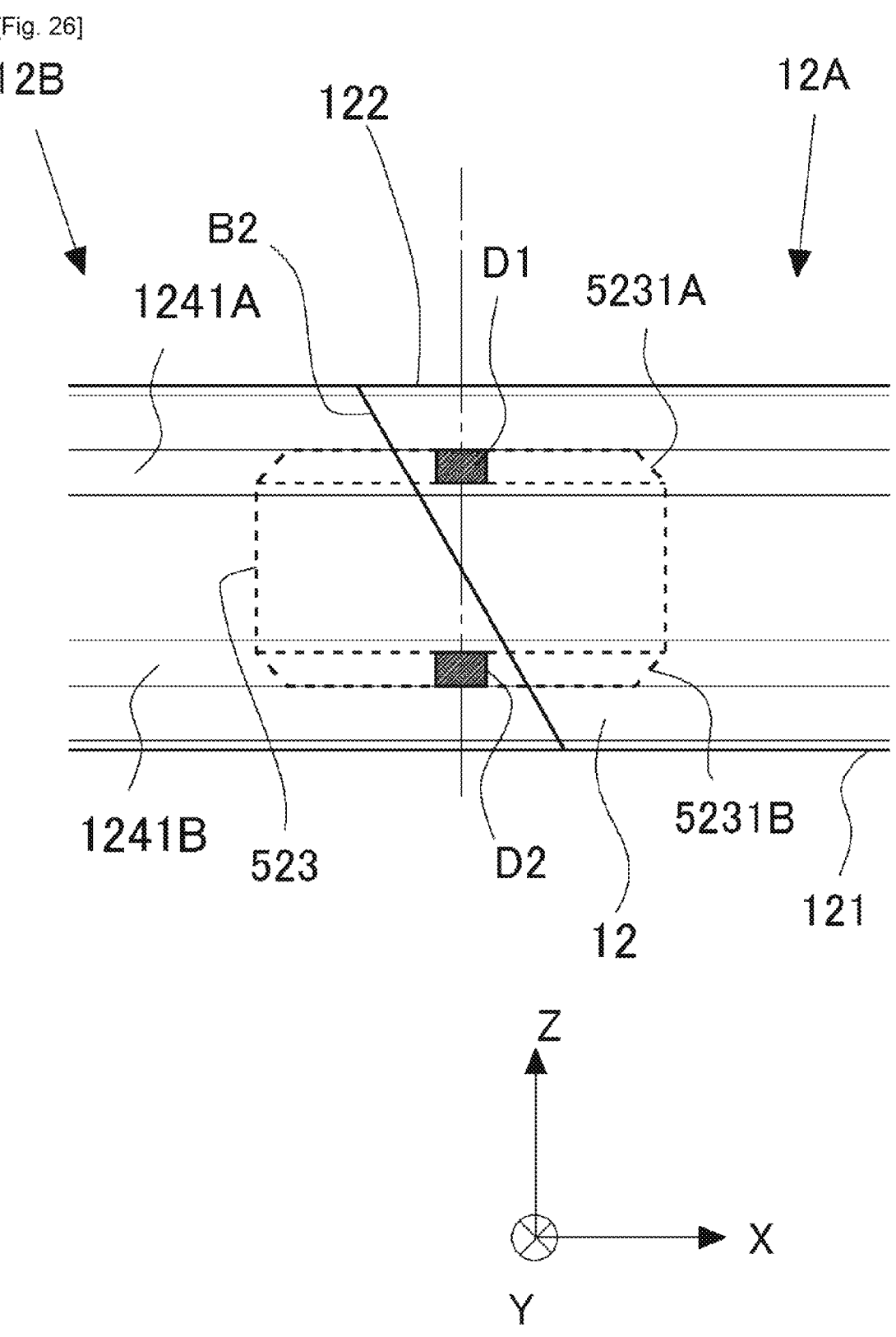

GUIDE DEVICE

TECHNICAL FIELD

The present invention relates to a guide device.

BACKGROUND ART

A guide device is known in which a rail is arranged to guide a carriage. In this guide device, there is known a technology to improve straightness by correcting the bending of the rail using an eccentric bolt (see, for example, Patent Literature 1).

CITATION LIST

Patent Literature

Patent Literature 1: JP 2003-127037 A

SUMMARY OF INVENTION

Technical Problem

Divided rails may be connected to construct a single rail. In this case, if there is a difference in level at a connecting portion of the rails, vibration may occur when the carriage passes through the difference. Therefore, conventionally, when connecting a plurality of rails, two reference surfaces (surfaces abutting against a rail bottom surface and a rail side surface, respectively) are provided on a rail mounting part side, and the rails are fixed to the rail mounting part while pressing the rails against the rail mounting part with a strong force using a vise or a bolt, thereby suppressing the occurrence of a difference in level at the connecting portion of the rails. However, this method is only viable if the two reference surfaces are formed on the same part.

On the other hand, in cases where a long path is to be constructed or in the case of products in which rails and rail mounting parts are modularized as represented by a linear conveyor system, the rail mounting parts are also divided, and the above rail mounting method may cause a difference in level to occur at a connecting portion of the rails. In such a case, fine adjustment is required, such as inserting a shim having a height corresponding to the difference in level between the rails and a reference surface, but such an adjustment work is very complicated and time-consuming. There is also room for improvement in a method of correcting rail bending using an eccentric bolt.

The present invention has been made in view of the various circumstances described above, and an object of the present invention is to reduce misalignment or shift of a joint of rails and to move a carriage more smoothly.

Solution to Problem

One of the aspects of the present invention is directed to a guide device equipped with a rail, comprising:
  a first surface in contact with a mounting surface;
  a second surface opposite the first surface;
  a through hole penetrating between the first surface and the second surface; and
  a recessed portion that is an opening of the through hole on a first surface side and is formed to be recessed from the first surface toward the second surface; wherein the recessed portion includes a third surface that is a surface orthogonal to the first surface and orthogonal to a width direction of the rail;
  the recessed portion receives an eccentric part that rotates eccentrically with respect to a reference axis orthogonal to the mounting surface to apply a force to the third surface in the width direction of the rail; and
  the through hole has a diameter smaller than a length of the recessed portion in the width direction.

Advantageous Effects of Invention

According to the present invention, elastic deformation of the tips of rails can reduce misalignment or shift of a joint between the rails and allow a carriage to move more smoothly.

BRIEF DESCRIPTION OF DRAWINGS

FIG. 1 is a view illustrating an external appearance of a guide device according to an embodiment.

FIG. 2 is a view illustrating the movement of a plurality of rollers in the guide device according to the embodiment.

FIG. 3 is a view illustrating a cross section of the guide device in a plane (YZ plane in FIG. 1) orthogonal to an extending direction of a rail according to the embodiment.

FIG. 4 is a view illustrating an example of a schematic configuration of a guide device before rails are connected to each other according to a first embodiment.

FIG. 5 is a view illustrating an example of a first module and a second module after connection thereof as seen from side according to the first embodiment.

FIG. 6 is a cross-sectional view when cut along an A-A cross section of FIG. 5 according to the first embodiment.

FIG. 7 is a view of a second rail as seen from its lower surface side according to the first embodiment.

FIG. 8 is an enlarged view of the vicinity of an eccentric bolt in the A-A cross section of FIG. 5 according to the first embodiment.

FIG. 9 is a cross-sectional view of the vicinity of the eccentric bolt when cut in a plane (XZ plane) orthogonal to a Y axis according to the first embodiment.

FIG. 10 is a cross-sectional view of the vicinity of the eccentric bolt when cut in a plane (YZ plane) orthogonal to an X axis according to the first embodiment.

FIG. 11 is a schematic view illustrating a state of the rail before a pressing force acts on a bolt contact surface from the head of the eccentric bolt in a Y axis direction according to the first embodiment.

FIG. 12 is a schematic view illustrating a state of the rail after a pressing force acts on the bolt contact surface from the head of the eccentric bolt in the Y axis direction according to the first embodiment.

FIG. 13 is a perspective view of a lower surface side of a second rail according to a second embodiment.

FIG. 14 is a perspective view of an upper surface side of a rail according to a third embodiment.

FIG. 15 is a perspective view of a lower surface side of the rail according to the third embodiment.

FIG. 16 is a cross-sectional view of the rail in a state where it is mounted on a mounting member according to the third embodiment.

FIG. 17 is a cross-sectional view of an adjustment hole when cut along a plane (YZ plane) orthogonal to an X axis direction according to the third embodiment.

FIG. 18 is a perspective view of an upper surface side of a rail according to a fourth embodiment.

FIG. 19 is a perspective view of a lower surface side of the rail according to the fourth embodiment.

FIG. 23 is an example of a perspective view of an upper surface side in a state where a first rail and a second rail are connected to each other according to the fifth embodiment.

FIG. 24 is a view illustrating an example of the rail and a carriage when seen from rear side according to the fifth embodiment.

FIG. 25 is a view illustrating an example of the rail and the carriage as seen from side according to the fifth embodiment.

FIG. 26 is a view illustrating an example of a connecting portion of the rail according to the fifth embodiment.

FIG. 30 is an example of a perspective view of an upper surface side in a state where a first rail and a second rail are connected to each other according to the sixth embodiment.

DESCRIPTION OF EMBODIMENTS

Figure 20:
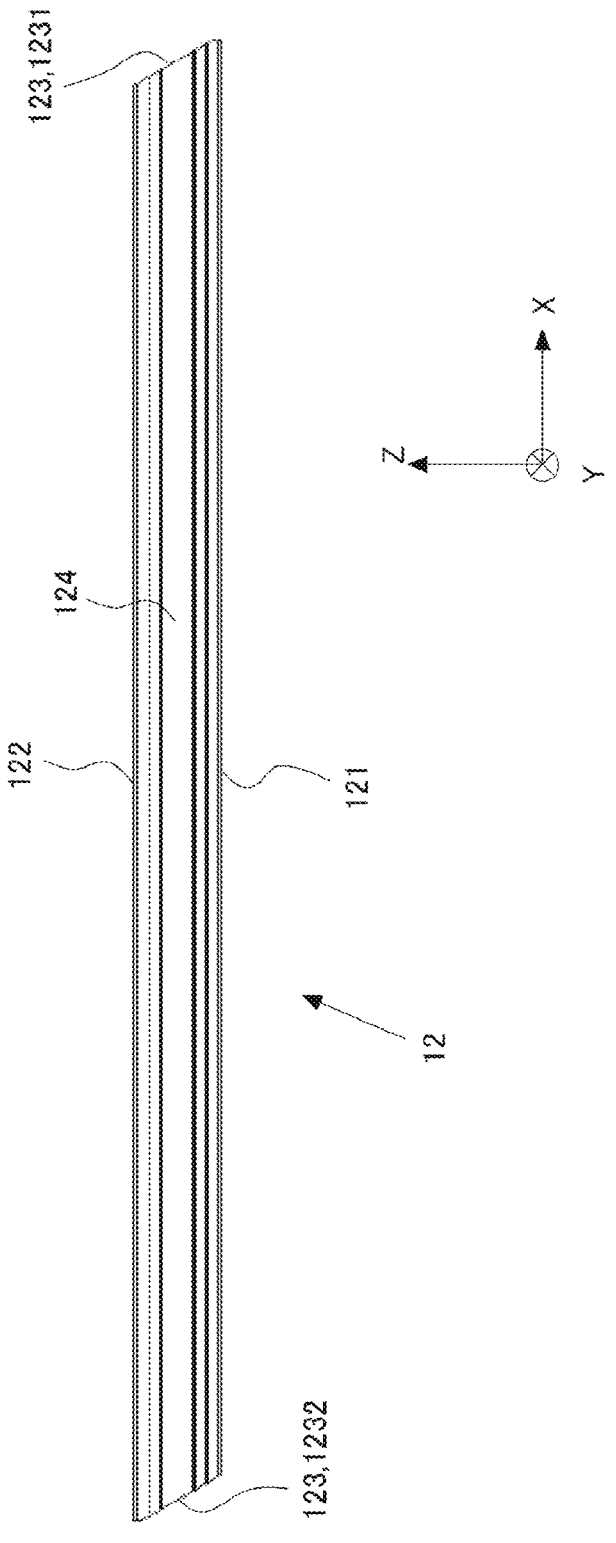
FIG. 20 is a view illustrating an example of a rail as seen from side according to a fifth embodiment.

A guide device, which is one of the aspects of the present invention, is equipped with a rail. The rail is mounted on a mounting surface to guide a carriage. When the rail is mounted on the mounting surface, a surface thereof in contact with the mounting surface is a first surface. Also, the rail has a second surface that is opposite the first surface. The first surface and the second surface are surfaces extending in the longitudinal direction of the rail. Note that the second surface may not be parallel to the first surface. In addition, the rail has a through hole. The through hole has a center axis orthogonal to the first surface and the mounting surface. A tool, for example, can be passed through the through hole. Further, the rail includes a recessed portion that is an opening on the first surface side of the through hole, and is formed to be recessed from the first surface toward the second surface. That is, the through hole is open in the recessed portion. Since the recessed portion is recessed from the first surface, a space surrounded by the recessed portion and the mounting surface is formed when the rail is mounted on the mounting surface.

The recessed portion includes a third surface that is a surface orthogonal to the first surface and is orthogonal to a width direction of the rail. The third surface is formed in the side surface direction of the rail among the surfaces forming the recessed portion. The third surface may be surfaces parallel to the side surfaces of the rail. Then, the recessed portion receives an eccentric part that rotates eccentrically about a reference axis orthogonal to the mounting surface to apply a force to the third surface in the width direction of the rail. The reference axis is an axis of rotation that is located on the mounting surface. This eccentric part makes contact with the third surface, whereby the eccentric part pushes against the third surface. Due to the force of this eccentric part pushing against the third surface, the rail is elastically deformed and bent. Since the eccentric part is eccentric with respect to the reference axis, the pushing force on the third surface can be adjusted by adjusting the angle of rotation. Thus, by rotating the eccentric part, it is possible to correct or straighten the bending of the rail.

Here, the through hole and the recessed portion are formed in such a manner that the diameter of the through hole is smaller than the length of the recessed portion in the width direction. Therefore, since the diameter of the through hole is relatively small, for example, when a tool for rotating the eccentric part is inserted into the through hole, the tool can be easily inserted into the eccentric part. Thus, the eccentric part can be rotated quickly, so that misalignment or shift of a joint between rails can be reduced by elastically deforming the tips of the rails.

In addition, the eccentric part may be a head of an eccentric bolt that rotates about the reference axis. A threaded portion of the bolt is screwed into the mounting surface. With the eccentric bolt, work can be simplified because the eccentric bolt can be attached to the mounting surface in advance and will not come off. Further, it is relatively easy to correct the bending of the rails with a tool that turns the eccentric bolt.

Moreover, the recessed portion may be formed up to at least one end of the rail. This makes it possible, for example, to receive the eccentric part in the recessed portion while moving the rail in the longitudinal direction, thereby simplifying the work.

Further, the through hole may be formed at a location closer to one end of the rail than a mounting hole that is a hole through which a bolt for fixing the rail to the mounting surface passes. For example, if the rail is mounted on the mounting surface by means of a bolt inserted through the mounting hole while applying a force to the third surface by the eccentric part to correct the bending of the rail, it is possible to fix the rail in a state where the bending of the rail is corrected. Also, the through hole is provided on the end side of the rail, so that even if there is a step between the rail and another rail when connecting them to each other, the rail can be bent in a direction to eliminate the step by rotating the eccentric part.

In addition, the through hole may be formed between a plurality of mounting holes that are holes through which bolts for fixing the rail to the mounting surface pass. If the rail is mounted on the mounting surface by the bolts passing through the mounting holes while applying a force to the third surface by means of the eccentric part to correct the bending of the rail, the rail can be fixed in a state where the bending of the rail is corrected. Further, with the provision of a plurality of mounting holes and a plurality of through holes, the bending of rails can be corrected at a plurality of locations, so that the straightness of the rails can be further increased, and the misalignment of rail joints can be reduced by elastically deforming the tips of the rails.

Hereinafter, embodiments of the present invention will be described with reference to the drawings. However, the dimensions, materials, shapes, relative arrangements and so on of component parts described in the embodiments are not intended to limit the scope of the present invention to these alone in particular unless otherwise stated. In addition, the following embodiments can be combined with one another as long as such combinations are possible and appropriate.

First Embodiment

First, the configuration of a guide device 1 will be described. FIG. 1 is a view illustrating an external appearance of the guide device 1 according to the present embodiment. The guide device 1 includes a rail 12 and a carriage 50 that is assembled to be relatively movable along a longitudinal direction of a rail 12. The rail 12 is mounted on a mounting surface of a user equipment such as for example a machine tool, and a table of the user equipment is attached to the carriage 50. In this case, the motion of movable parts including the table is guided by the guide device 1. Note that the guide device 1 can be turned upside down, so that the carriage 50 can be mounted on the mounting surface of the user equipment, and the rail 12 can be mounted on the table. Also, the guide device 1 may be used in a state where the longitudinal direction of the rail 12 is not horizontal but is inclined or orthogonal to a horizontal plane.

Figure 3:
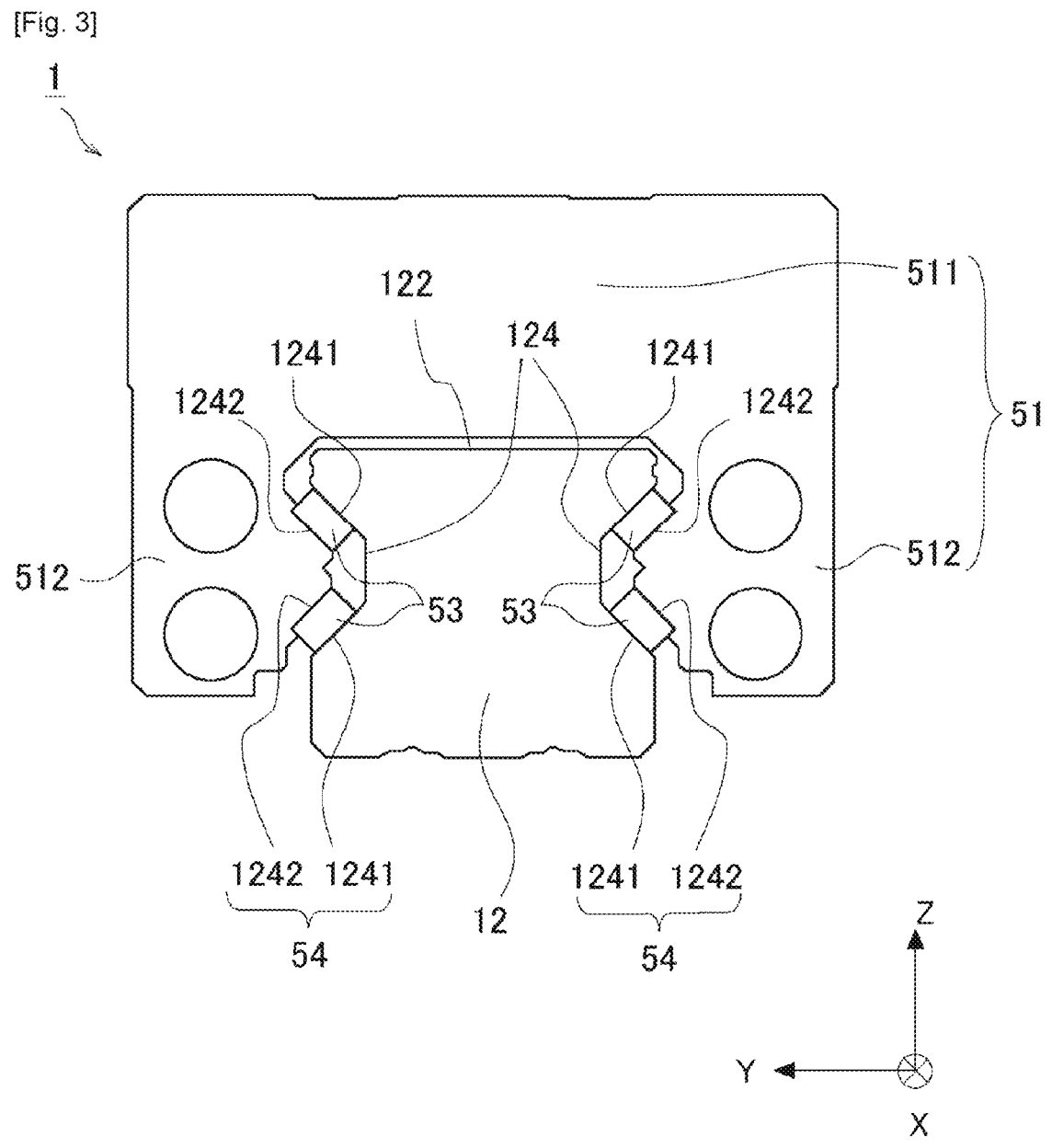

Here, note that in the present application, for convenience of explanation, the rail 12 is arranged on a horizontal plane. Thus, in the following description, an XYZ orthogonal coordinate system is set up, and the positions of respective members will be described with reference to this XYZ orthogonal coordinate system. The configuration of the guide device 1 will be described in the direction as viewed from the longitudinal direction of the rail 12, that is, an X axis direction shown in FIG. 1 is a front-rear direction, a Y axis direction is a left-right direction, and a Z axis direction is an up-down direction. Of course, the arrangement of the guide device 1 is not limited to such an arrangement. In addition, FIG. 2 is a view illustrating the movement of a plurality of rollers 53 in the guide device 1 according to the present embodiment. FIG. 3 is a view illustrating a cross section of the guide device 1 in a plane (YZ plane in FIG. 1) orthogonal to the longitudinal direction of the rail 12 according to the present embodiment.

Also, surfaces of the rail 12 orthogonal to the Y axis direction are referred to as side surfaces 124. As illustrated in FIG. 3, two upper and lower rolling surfaces 1241 are formed on each of the right and left side surfaces 124 of the rail 12. That is, four rolling surfaces 1241 are formed on the rail 12.

The carriage 50 is U-shaped in cross section, having a central portion facing an upper surface 122, which is an upper surface of the rail 12, and a pair of side portions facing the side surfaces of the rail 12. Specifically, as illustrated in FIG. 1, the carriage 50 includes a carriage body 51 in the center of the moving direction and a pair of end plates 52 arranged at both ends of the carriage body 51 in the moving direction. Then, as illustrated in FIG. 3, the carriage body 51 is U-shaped in cross section, having a central portion 511 facing the upper surface 122 of the rail 12 and a pair of side portions 512 facing the side surfaces 124 of the rail 12. Further, similar to the carriage body 51, the end plates 52 also are each U-shaped in cross section, having a central portion facing the upper surface 122 of the rail 12 and a pair of side portions facing the side surfaces 124 of the rail 12. Each end plate 52 is fastened to the carriage body 51 by fastening members such as bolts.

As illustrated in FIG. 3, the carriage body 51 has four rolling surfaces 1242 respectively facing the four rolling surfaces 1241 of the rail 12. Then, the carriage body 51 is engaged with the rail 12 by sandwiching the plurality of rollers 53 between the rolling surfaces 1241 formed on the rail 12 and the rolling surfaces 1242 formed on the carriage body 51 in a rollable state. Thus, loaded rolling paths 54 are defined by the rolling surfaces 1241 of the rail 12 and the rolling surfaces 1242 of the carriage body 51, which face each other. In addition, as illustrated in FIG. 2, a return path 55 is formed inside the carriage body 51 in parallel with each loaded rolling path 54. Also, each end plate 52 has a U-shaped direction change path 56 that connects a loaded rolling path 54 and a return path 55. The inner peripheral side of the direction change path 56 is formed by an inner peripheral portion 57, which is semicircular in cross section and integral with the carriage body 51. Then, a track-shaped rolling element path 58 is formed by a loaded rolling path 54 between a rolling surface 1241 of the rail 12 and a rolling surface 1242 of the carriage body 51, a pair of direction change paths 56, and a return path 55. A plurality of rollers 53 are accommodated in this rolling element path 58. Then, in the guide device 1, as illustrated in FIG. 2, when the carriage 50 relatively moves with respect to the rail 12 in the direction of an outlined arrow, the plurality of rollers 53 circulate in the direction of arrows through the rolling element path 58. In other words, the rollers 53 present between the rolling surfaces 1241, 1242 facing each other roll on the loaded rolling path 54. Further, the rollers 53 that have rolled to one end of the loaded rolling path 54 are introduced into one of the direction change paths 56, pass through the return path 55 and the other direction change path 56, and return to the other end of the loaded rolling path 54.

Figure 4:
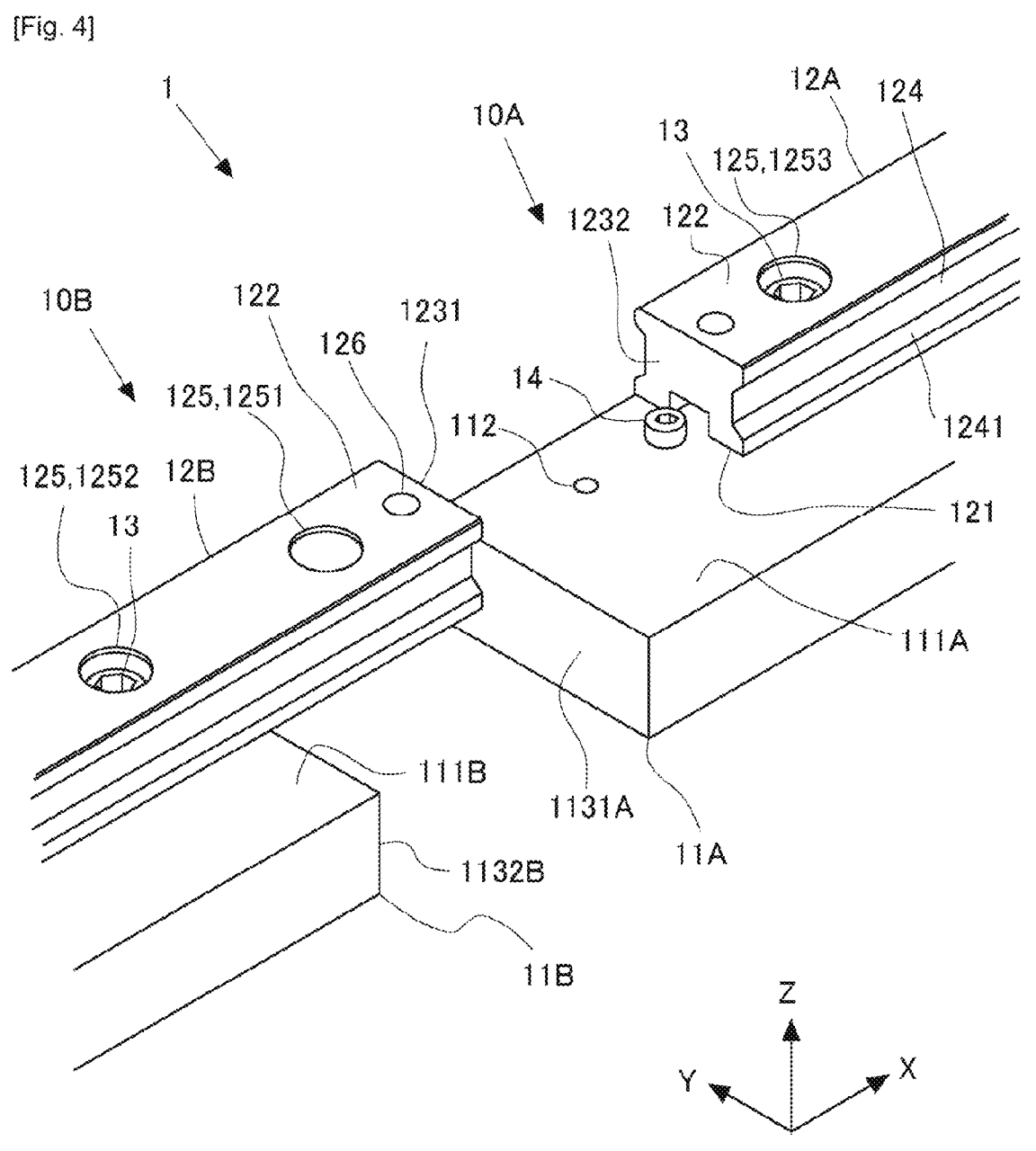

Next, the connection of a plurality of rails 12 will be described. In the first embodiment, an example of the guide device 1 that connects a first module 10A and a second module 10B will be described. FIG. 4 is a view illustrating an example of a schematic configuration of the guide device 1 before connecting the rails 12 according to the first embodiment. The guide device 1 includes the first module 10A and the second module 10B. The first module 10A includes a first mounting member 11A and a first rail 12A that is fixed to a mounting surface 111A of the first mounting member 11A. The second module 10B includes a second mounting member 11B and a second rail 12B that is fixed to a mounting surface 111B of the second mounting member 11B. Note that in the following, the first module 10A and the second module 10B will be described as having the same shape. However, the first module 10A and the second module 10B are not limited to this, but may have different shapes.

Here, note that when the first mounting member 11A and the second mounting member 11B are not distinguished from each other, they are simply referred to as the mounting member 11, and when the mounting surface 111A of the first mounting member 11A and the mounting surface 111B of the second mounting member 11B are not distinguished from each other, they are simply referred to as the mounting surface 111.

The mounting surface 111 is the mounting surface of the user equipment. Also, when the first rail 12A and the second rail 12B are not distinguished from each other, they are simply referred to as the rail 12. The mounting surface 111 of the mounting member 11 is a surface to which the rail 12 is mounted and fixed.

Here, note that the direction orthogonal to the mounting surface 111 is the Z axis direction, the longitudinal direction of the rail 12 on the mounting surface 111 is the X axis direction, and the transverse direction of the rail 12 on the mounting surface 111 is the Y axis direction. In addition, in the X axis direction, a first module 10A side is a front side, and a second module 10B side is a rear side. Also, in the Z axis direction, a rail 12 side is an upper side, and a mounting member 11 side is a lower side. Further, the Y axis direction is also referred to as a width direction.

In addition, a surface of the rail 12, which is in contact with the mounting member 11 (a surface facing downward) and is opposite the upper surface 122, is referred to as a lower surface 121. The lower surface 121 and the upper surface 122 are surfaces orthogonal to the Z axis direction.

Note that the upper surface 122 is not limited to this, but may be a surface inclined with respect to the Z axis direction. Also, note that the lower surface 121 is an example of the first surface, and the upper surface 122 is an example of the second surface.

In addition, the surfaces where the rails 12 contact each other when the rails 12 are connected to each other (surfaces at their ends in the X axis direction) are referred to as end faces 123. An end face 123 on the front side in the X axis direction is referred to as a front end face 1231, and an end face 123 on the rear side in the X axis direction is referred to as a rear end face 1232. Note that in the embodiment, the front end face 1231 and the rear end face 1232 will be described as surfaces orthogonal to the X axis direction, but they are not limited thereto, and for example, the front end face 1231 and the rear end face 1232 may be surfaces having an acute angle or an obtuse angle with respect to the X axis direction. FIG. 4 illustrates a state before the front end face 1231 of the second rail 12B is connected to the rear end face 1232 of the first rail 12A.

The rails 12 have bolt mounting holes 125 formed therein, which are through holes through which mounting bolts 13 are passed to secure the rails to the mounting surfaces 111. The bolt mounting holes 125 are each formed in the Z axis direction. A plurality of the bolt mounting holes 125 are provided in each rail 12 in the X axis direction. A counterbore is formed on an upper surface 122 side of each bolt mounting hole 125, so that the head of each mounting bolt 13 is received in each rail 12.

In addition, the mounting members 11 have threaded holes 112 formed in the Z axis direction into which the mounting bolts 13 are tightened. The threaded holes 112 are formed vertically from the mounting surfaces 111 at locations corresponding to the bolt mounting holes 125 of the rails 12.

FIG. 5 illustrates an example of a side view of the first module 10A and the second module 10B after they are connected to each other according to the first embodiment. FIG. 5 is a view of the guide device 1 as seen from the Y axis direction. FIG. 6 is a cross-sectional view taken along line A-A of FIG. 5 according to the first embodiment. The connecting portion B1 for both the mounting members 11 and the connecting portion B2 for both the rails 12 are arranged to be shifted in the X axis direction in such a manner that the connecting portion B2 for the rails 12 and the connecting portion B1 for the mounting members 11 are not on the same plane when the first module 10A and the second module 10B are connected to each other. That is, in the first module 10A, the rear end face 1232 of the first rail 12A is arranged to be shifted forward from the rear end face 1131A of the first mounting member 11A. On the other hand, in the second module 10B, the front end face 1231 of the second rail 12B is arranged to be shifted forward from the front end face 1132B of the second mounting member 11B.

In the second module 10B, the bolt mounting hole 125 at the most front side of the second rail 12B is provided at a position protruding from the second mounting member 11B. Note that the bolt mounting hole 125 at the most front side of the rail 12 is hereinafter referred to as a first bolt mounting hole 1251. The mounting member 11 is formed with threaded holes 112 corresponding to the second and subsequent bolt mounting holes 125 from the front side of the rail 12, into which the mounting bolts 13 are inserted. Note that the second bolt mounting hole 125 from the front side of the rail 12 is hereinafter referred to as a second bolt mounting hole 1252. The second rail 12B is fixed to the second mounting member 11B by the mounting bolts 13 inserted into the second bolt mounting hole 1252 and a plurality of subsequent bolt mounting holes 125.

In the first module 10A, a mounting bolt 13 is inserted into the bolt mounting hole 125 at the rearmost side of the first rail 12A, and further, mounting bolts 13 are inserted into the bolt mounting holes 125 other than the first bolt mounting hole 1251 in the same manner as in the second module 10B. Note that the bolt mounting hole 125 at the rearmost side of the rail 12 is hereinafter referred to as a third bolt mounting hole 1253. The first rail 12A is fixed to the first mounting member 11A by the mounting bolts 13 inserted into the plurality of bolt mounting holes 125 from the second bolt mounting hole 1252 to the third bolt mounting hole 1253.

The second rail 12B has an adjustment hole 126, which is a through hole, formed therein at a position closer to the front end face 1231 than the first bolt mounting hole 1251. FIG. 7 is a view of the second rail 12B according to the first embodiment as seen from the lower surface 121 side. The adjustment hole 126 is formed in the Z axis direction. A recessed portion 1260 recessed from the lower surface 121 toward the upper surface 122 of the second rail 12B is formed in an opening portion of the recessed portion 1260 on the lower surface 121 side. The recessed portion 1260 has its end in the X axis direction opening into the front end face 1231 of the second rail 12B. The recessed portion 1260 is formed from the front end face 1231 toward the rear end face 1232 side in the X axis direction. The recessed portion 1260 receives a head 141 of an eccentric bolt 14. The head 141 of the eccentric bolt 14 is an example of an eccentric part. Note that in order to increase the versatility of the rail 12, the adjustment hole 126, which is a through hole, and the recessed portion 1260 are also formed at locations closer to the rear end face 1232 than the third bolt mounting hole 1253, but these are not necessarily required.

FIG. 8 is an enlarged view of the vicinity of the eccentric bolt 14 in a cross section taken along line A-A of FIG. 5 according to the first embodiment. FIG. 9 is a cross-sectional view when the vicinity of the eccentric bolt 14 is cut by a plane (XZ plane) orthogonal to the Y axis according to the first embodiment. FIG. 10 is a cross-sectional view when the vicinity of the eccentric bolt 14 is cut by a plane (YZ plane) orthogonal to the X axis according to the first embodiment. The recessed portion 1260 has bolt contact surfaces 1261 which are two planes parallel to each other and orthogonal to the Y axis, a semi-cylindrical curved surface 1262 which is in contact with the two bolt contact surfaces 1261 and protrudes from the bolt contact surfaces 1261 toward the rear end face 1232 side, and a bottom surface 1263 which is a plane orthogonal to the Z axis and in which an opening of the adjustment hole 126 is formed. Note that the bolt contact surfaces 1261 are an example of a third surface.

The distance between the two bolt contact surfaces 1261 is longer than the diameter of the adjustment hole 126. That is, the diameter of the adjustment hole 126 is shorter than the length of the recessed portion 1260 in the width direction (Y axis direction). In addition, the distance between the two bolt contact surfaces 1261 is formed to be slightly longer than the diameter of the head 141 of the eccentric bolt 14 in such a manner that the head 141 of the eccentric bolt 14 is received therebetween. On the other hand, the diameter of the adjustment hole 126 is formed to be shorter than the diameter of the head 141 of the eccentric bolt 14 and longer than the width (may be the diameter) of a tool 30 for turning the eccentric bolt 14. The tool 30 is, for example, a hexagonal wrench.

The eccentric bolt 14 is attached to the first mounting member 11A. The first mounting member 11A is formed with an adjustment threaded hole 114 corresponding to the eccentric bolt 14. The central axis of the adjustment threaded hole 114 is positioned on the same plane as the central axis of the threaded hole 112 for the mounting bolt 13. In addition, the adjustment hole 126 and the adjustment threaded hole 114 are formed in such a manner that the distance from the rear end face 1232 of the first rail 12A to the central axis of the adjustment threaded hole 114 is substantially equal to the distance from the front end face 1231 of the second rail 12B to the central axis of the adjustment hole 126. Also, the first mounting member 11A is formed with a threaded hole 112 corresponding to the first bolt mounting hole 1251 in the second rail 12B. The first bolt mounting hole 1251 and the threaded hole 112 corresponding thereto are formed in such a manner that the distance from the rear end face 1232 of the first rail 12A to the central axis of the threaded hole 112 is substantially equal to the distance from the front end face 1231 of the second rail 12B to the central axis of the first bolt mounting hole 1251.

The eccentric bolt 14 has the head 141 and a threaded portion 142 that is connected to the head 141 and formed with a screw thread. The eccentric bolt 14 is formed in such a manner that the central axis A1 of the head 141 is shifted with respect to the central axis A2 of the threaded portion 142. The eccentric bolt 14 is, for example, a hexagonal socket bolt, and has a hexagonal columnar hole (hereinafter, also referred to as a hexagonal hole 1411) formed in its cylindrical head 141. The central axis of the hexagonal hole 1411 is located, for example, on the central axis of the threaded portion 142. The eccentric bolt 14 is attached to the first mounting member 11A before the first module 10A and the second module 10B are connected to each other.

The recessed portion 1260 is formed in such a manner that the distance from the lower surface 121 of the second rail 12B to the bottom surface 1263 is longer than the length of the head 141 of the eccentric bolt 14 in the direction of the central axis A1. In addition, the recessed portion 1260 is also formed in such a manner that the distance between the two bolt contact surfaces 1261 is longer than the diameter of the head 141 of the eccentric bolt 14 and shorter than the diameter of the head 141 of the eccentric bolt 14 plus the distance from the central axis A2 of the threaded portion 142 of the eccentric bolt 14 to the central axis A1 of the head 141. By forming the recessed portion 1260 in this manner, the head 141 of the eccentric bolt 14 can be received in the recessed portion 1260, and when the eccentric bolt 14 is rotated, the side surface of the head 141 comes into contact with the bolt contact surfaces 1261, so that the head 141 can push the bolt contact surfaces 1261 in the Y axis direction.

Here, note that when the eccentric bolt 14 is attached to the first mounting member 11A, the angle of the head 141 of the eccentric bolt 14 is adjusted in such a manner that a plane including the central axis A2 of the threaded portion 142 and the central axis A1 of the head 141 is orthogonal to the Y axis direction. Thus, when the second module 10B is connected to the first module 10A, the head 141 of the eccentric bolt 14 can be received in the recessed portion 1260.

Next, a method of connecting the first module 10A and the second module 10B will be described. From the state illustrated in FIG. 4, the second rail 12B is placed on the mounting surface 111A of the first mounting member 11A. At this time, the second rail 12B may be shifted in the X axis direction and mounted on the mounting surface 111A of the first mounting member 11A, or the second rail 12B may be mounted on the mounting surface 111A of the first mounting member 11A from above in the Z axis direction. After the second rail 12B is placed on the mounting surface 111A of the first mounting member 11A, a mounting bolt 13 is temporarily fastened to the first bolt mounting hole 1251 of the second rail 12B. At this time, the mounting bolt 13 is temporarily tightened with enough torque to allow the second rail 12B to move in the Y axis direction.

Here, note that the first mounting member 11A and the second mounting member 11B may be fixed to another base member by, for example, bolts or the like, or the first mounting member 11A and the second mounting member 11B may be connected to each other by bolts or the like. The method of fixing the first mounting member 11A and the second mounting member 11B is not limited.

After inserting the tool 30 into the adjustment hole 126 with the mounting bolt 13 temporarily fastened into the first bolt mounting hole 1251 of the second rail 12B, when the tool 30 is operated to rotate the eccentric bolt 14 around the central axis A2 of the threaded portion 142, a pressing force acts on one of the bolt contact surfaces 1261 in the Y axis direction. As a result, the second rail 12B is bent in the direction of the pressing force. At this time, for example, the rotation angle of the eccentric bolt 14 is adjusted by using a micrometer in such a manner that a step or difference in level between the side surfaces 124 of the first rail 12A and the side surfaces 124 of the second rail 12B is equal to or less than a predetermined value. Then, after the difference in level between the side surfaces 124 of the first rail 12A and the side surfaces 124 of the second rail 12B becomes equal to or less than the predetermined value, the mounting bolt 13 temporarily fastened to the first bolt mounting hole 1251 of the second rail 12B is finally or completely tightened, thereby fixing the second rail 12B to the first mounting member 11A.

FIG. 11 is a schematic view illustrating the state of the rail 12 before a pressing force is exerted in the Y axis direction from the head 141 of the eccentric bolt 14 to the bolt contact surfaces 1261 according to the first embodiment. Also, FIG. 12 is a schematic view illustrating the state of the rail 12 after the pressing force is exerted in the Y axis direction from the head 141 of the eccentric bolt 14 to the bolt contact surfaces 1261 according to the first embodiment. FIGS. 11 and 12 are views of the rail 12 as seen from the upper surface 122 side.

Before the pressing force is exerted to the bolt contact surfaces 1261 in the Y axis direction (see FIG. 11), a side surface 124A of the first rail 12A and a side surface 124B of the second rail 12B are shifted from each other by a distance indicated by C1 in the Y axis direction at the connecting portion B2 of the rail 12. On the other hand, after the pressing force is exerted to the bolt contact surfaces 1261 in the Y axis direction (see FIG. 12), the second rail 12B is elastically deformed by this pressing force, so that its tip end portion is moved in the Y axis direction. As a result, the shift in the Y axis direction of the side surface 124A of the first rail 12A and the side surface 124B of the second rail 12B at the connecting portion B2 of the rail 12 is reduced to a distance indicated by C2.

In this way, by adjusting the rotation angle of the head 141 of the eccentric bolt 14 to elastically deform the tip of the rail 12, the bending or shift of the rail 12 can be corrected, so that the shift at the joint of the rail 12 can be reduced. As a result, the occurrence of a step at the connecting portion B2 of the rail 12 can be suppressed. Therefore, the carriage can be moved more smoothly. In addition, the provision of the recessed portion 1260 allows the front end face 1231 of the second rail 12B to contact the rear end face 1232 of the first rail 12A while moving the second rail 12B in the longitudinal direction (X axis direction) after the eccentric bolt 14 is attached to the first mounting member 11A. Also, attaching the eccentric bolt 14 to the first mounting member 11A in advance facilitates positioning of the second rail 12B when it is connected. Moreover, by making the diameter of the adjustment hole 126 shorter than the width of the recessed portion 1260 in the Y axis direction, it becomes easier for the tool 30 to enter the hexagonal hole 1411 in the head 141. Thus, it becomes easier to rotate the eccentric bolt 14 after the second rail 12B is brought into contact with the first rail 12A. For example, in cases where there is an obstruction above the first rail 12A and the second rail 12B, it may not be possible to visually see the adjustment hole 126 when the eccentric bolt 14 is tightened later. In such a case, since the adjustment hole 126 is checked and the tool 30 is inserted by groping, if the adjustment hole 126 is too large for the tool 30, it may be difficult to insert the tool 30 into the hexagonal hole 1411 of the eccentric bolt 14. With the adjustment hole 126 according to the first embodiment, it is easier to insert the tool 30 into the hexagonal hole 1411 of the eccentric bolt 14, which allows the rail 12 to be corrected more quickly.

Second Embodiment

Figure 13:
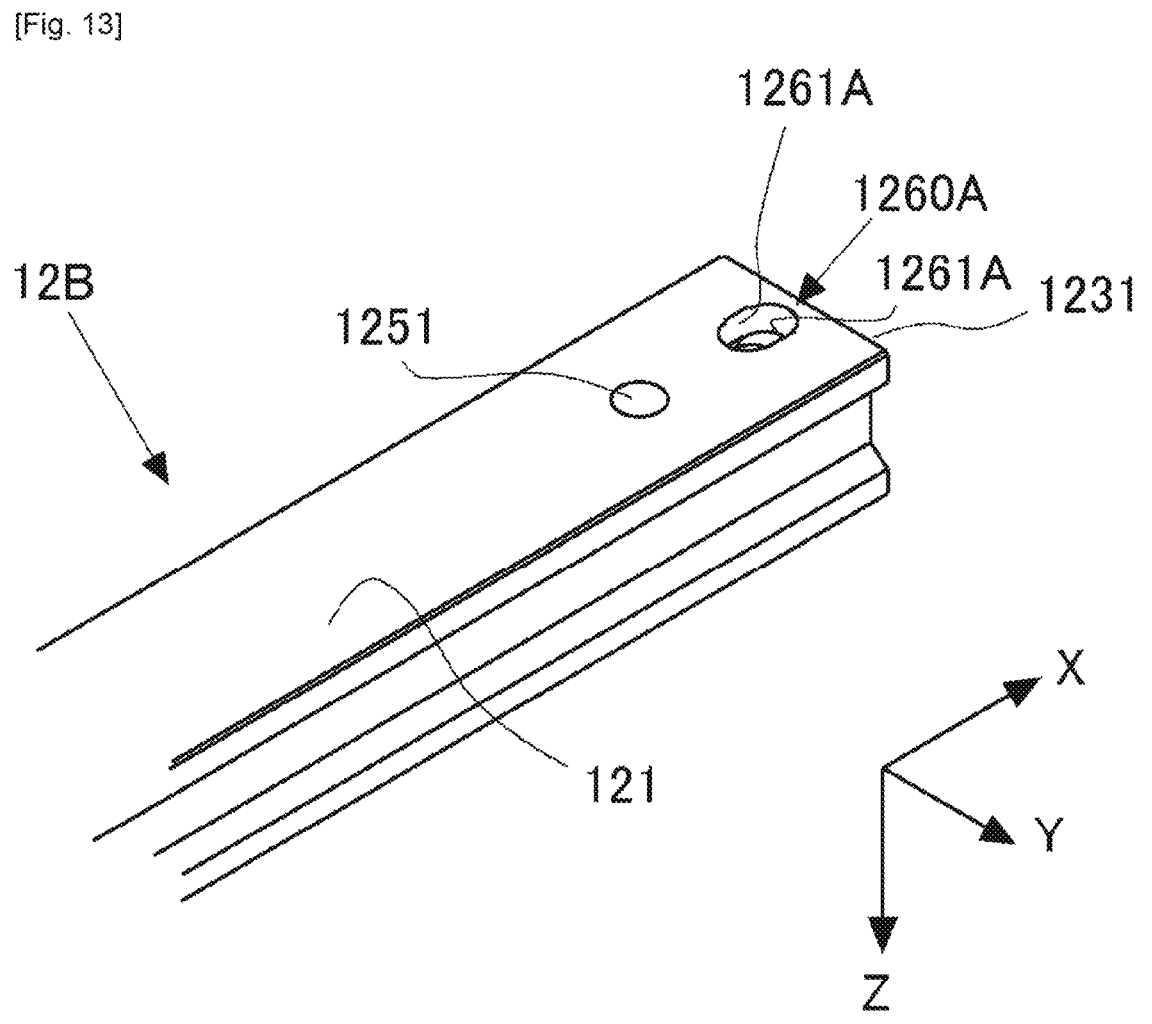

In the first embodiment, the recessed portion 1260 is formed up to the front end face 1231 of the second rail 12B, but in this second embodiment, a recessed portion 1260A is formed so as not to reach the front end face 1231 of the second rail 12B. FIG. 13 is a perspective view of the lower surface 121 side of the second rail 12B according to the second embodiment. The recessed portion 1260 is formed in such a manner that its cross section when cut by a plane orthogonal to the Z axis direction is an elongated hole. There are formed two bolt contact surfaces 1261A, which are orthogonal to the Y axis direction and parallel to each other, and the distance between the two bolt contact surfaces 1261A is equal to the distance between the two bolt contact surfaces 1261 according to the first embodiment. Note that the second embodiment is the same as the first embodiment, except for the shape of the front end face 1231 side of the recessed portion 1260A. Therefore, the distance between the two bolt contact surfaces 1261A is longer than the diameter of the adjustment hole 126.

Even with such a shape, the tool 30 can be easily inserted into the hexagonal hole 1411, so that the rail can be corrected or straightened more quickly. In addition, the cross-sectional shape of the recessed portion 1260A in the form of an elongated hole can suppress deformation of the recessed portion 1260 when a force is applied to the recessed portion 1260 from the eccentric bolt 14.

Third Embodiment

In this third embodiment, an example of correcting the bending of a single rail 12 will be described. FIG. 14 is a perspective view of the upper surface 122 side of the rail 12 according to the third embodiment, and FIG. 15 is a perspective view of the lower surface 121 side of the rail 12 according to the third embodiment. Also, FIG. 16 is a cross-sectional view of the rail 12 in a state where it is mounted on the mounting member 11 according to the third embodiment.

The rail 12 has a plurality of bolt mounting holes 125 and a plurality of adjustment holes 126 formed alternately in the longitudinal direction of the rail. For example, the bolt mounting holes 125 and the adjustment holes 126 may be alternately arranged at equal intervals. Also, for example, an adjustment hole 126 may be formed for each predetermined number of the bolt mounting holes 125. Note that the shape of the bolt mounting holes 125 is the same as the shape of the bolt mounting holes 125 according to the first embodiment. The plurality of adjustment holes 126 respectively lead to recessed portions 1260A on the lower surface 121 side. The shape of the recessed portions 1260A is the same as the shape of the recessed portions 1260A according to the second embodiment.

Here, FIG. 17 is a cross-sectional view of an adjustment hole 126 according to the third embodiment when cut in a plane orthogonal to the X axis direction (YZ plane). The mounting member 11 is provided with a reference surface 1110. The reference surface 1110 is a surface that rises in the Z axis direction from the mounting surface 111 and is orthogonal to the Y axis direction. The distance from the central axis of an adjustment threaded hole 114 to the reference surface 1110 is substantially equal to the distance from the central axis of the adjustment hole 126 to a side surface 124 of the rail 12.

In the case of fixing the rail 12 to the mounting member 11, the rail 12 is placed on the mounting surface 111 from the upper side thereof in a state where eccentric bolts 14 are attached to the mounting member 11. Note that when the eccentric bolts 14 are attached to the mounting member 11, the angle of the head 141 of each eccentric bolt 14 is adjusted in such a manner that a plane including the central axis A2 of the threaded portion 142 and the central axis A1 of the head 141 is orthogonal to the Y axis direction, as in the first embodiment.

After the rail 12 is placed on the mounting surface 111 of the mounting member 11, the mounting bolts 13 are inserted into and temporarily tightened to the respective bolt mounting holes 125 of the rail 12. At this time, the mounting bolts 13 are temporarily tightened with enough torque to allow the rail 12 to move in the Y axis direction. Then, the tool 30 is inserted into each adjustment hole 126 to rotate each eccentric bolt 14, thereby exerting a pressing force in the Y axis direction against the bolt contact surface 1261A on the reference surface 1110 side. As a result, the side surface 124 of the rail 12 is pressed against the reference surface 1110. At this time, for example, each eccentric bolt 14 may be tightened with a predetermined torque so that a predetermined pressing force acts on the bolt contact surface 1261A. After all the eccentric bolts 14 are tightened, the mounting bolts 13 are finally tightened.

Thus, by using the plurality of eccentric bolts 14, the rail 12 can be pressed against the reference surface 1110 to correct the bending of the entire rail 12. In addition, when connecting respective rails 12 to each other, if they are on the same reference surface 1110, each rail 12 can be pressed against the reference surface 1110, thereby preventing steps from occurring between the rails 12. Also, the tool 30 can be easily inserted into the hexagonal holes 1411, thus allowing the rails 12 to be corrected more quickly.

Fourth Embodiment

In this fourth embodiment, an example of correcting the bending of a single rail 12 will be described. FIG. 18 is a perspective view of the upper surface 122 side of the rail 12 according to the fourth embodiment, and FIG. 19 is a perspective view of the lower surface 121 side of the rail 12 according to the fourth embodiment.

The upper surface 122 side of the rail 12 has the same shape as the upper surface 12 side of the rail 12 according to the third embodiment. On the other hand, the lower surface 121 of the rail 12 is formed with a recessed portion 1260B which is recessed from the lower surface 121 toward the upper surface 122 of the second rail 12B in the longitudinal direction (X axis direction) thereof from its front end face 1231 to its rear end face 1232. The ends of the recessed portion 1260B in the X axis direction are open to the front end face 1231 and the rear end face 1232 of the rail 12.

The recessed portion 1260B has bolt contact surfaces 1261B, which are two planes orthogonal to the Y axis and parallel to each other, and a bottom surface 1263B, which is a plane orthogonal to the Z axis and in which openings for bolt mounting holes 125 and openings for adjustment holes 126 are formed. The distance between the two bolt contact surfaces 1261B is equal to the distance between the two bolt contact surfaces 1261 in the first embodiment. Also, the distance from the lower surface 121 of the rail 12 to the bottom surface 1263B is equal to the distance from the lower surface 121 of the rail 12 to the bottom surface 1263 in the first embodiment.

By having such a recessed portion 1260B formed, as in the third embodiment, the rail 12 can be pressed against the reference surface 1110 to correct the bending of the entire rail 12 by applying a pressing force in the Y axis direction from a plurality of eccentric bolts 14 against one of the bolt contact surfaces 1261A. In addition, in cases where respective rails 12 are connected to each other, if they are on the same reference surface 1110, each rail 12 can be pressed against the reference surface 1110, thereby preventing steps from occurring between the rails 12. Further, since the recessed portion 1260B is open to the front end face 1231 and the rear end face 1232, the rails 12 can be positioned in place while being moved in the X axis direction with respect to the mounting surface 111. Also, the tool 30 can be easily inserted into the hexagonal holes 1411, thus allowing the rails 12 to be corrected more quickly.

Fifth Embodiment

Figure 21:
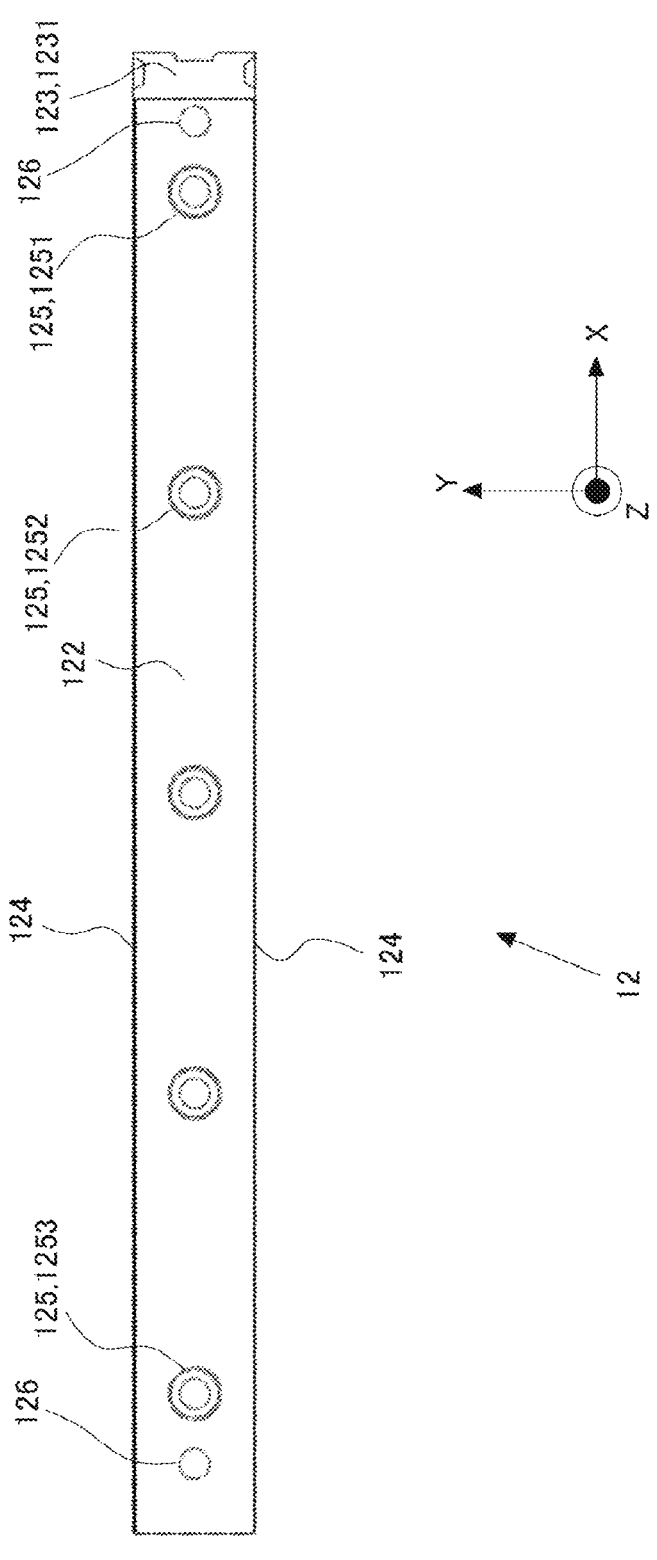
FIG. 21 is a view illustrating an example of the rail when seen from above according to the fifth embodiment.
Figure 22:
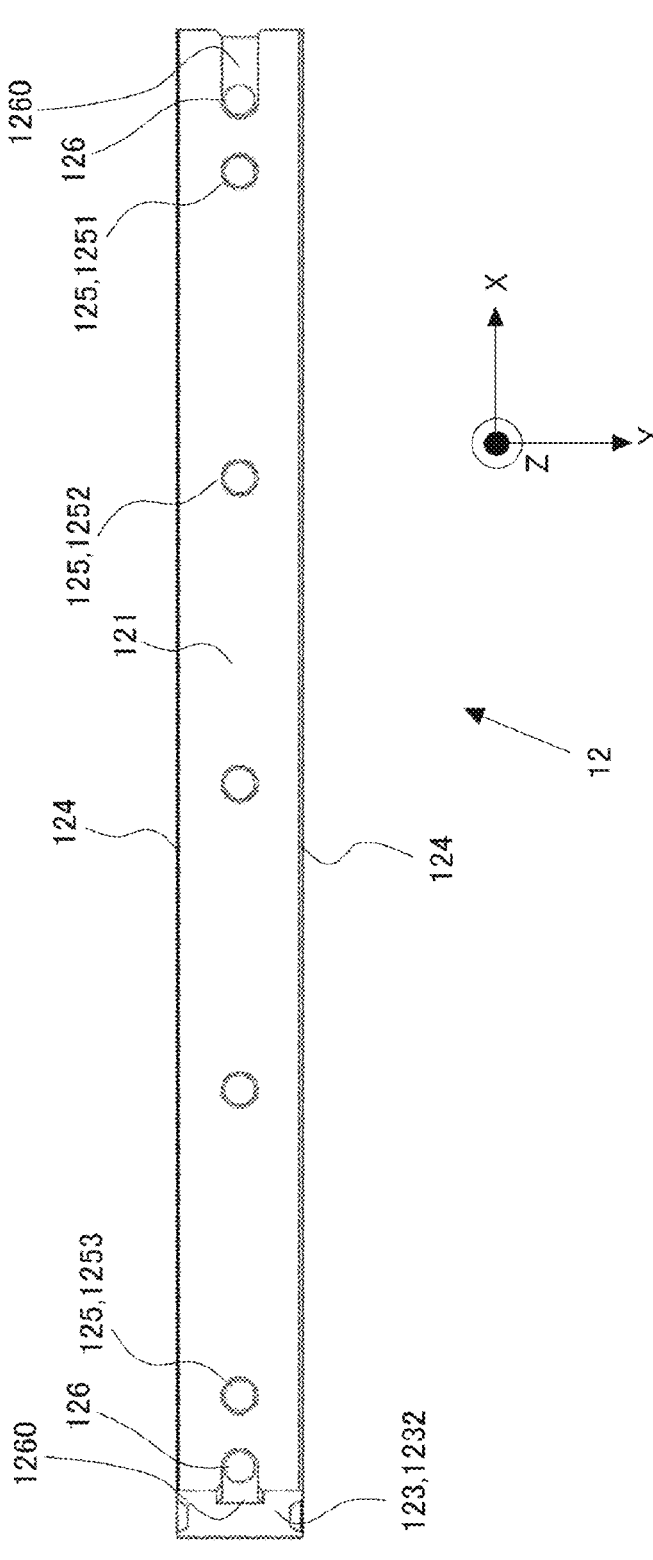
FIG. 22 is a view illustrating an example of the rail when seen from below according to the fifth embodiment.

In the rails 12 according to the first through fourth embodiments, the end faces 123 are orthogonal to the X axis direction. On the other hand, in a rail 12 according to this fifth embodiment, its end faces 123 are inclined with respect to the X axis direction. Further, the end faces 123 are parallel to the Y axis direction and are inclined with respect to the Z axis direction. FIG. 20 is a view illustrating an example of the rail 12 as seen from side according to the fifth embodiment. FIG. 21 is a view illustrating an example of the rail 12 when seen from above according to the fifth embodiment. FIG. 22 is a view illustrating an example of the rail 12 when viewed from below according to the fifth embodiment. FIG. 23 is an example of a perspective view of an upper surface 122 side in a state where a first rail 12A and a second rail 12B are connected to each other according to the fifth embodiment.

A front end face 1231 is formed so as to protrude forward as it goes from the upper surface 122 side to the lower surface 121 side. Also, a rear end face 1232 is formed so as to protrude rearward as it goes from the lower surface 121 side to the upper surface 122 side. In FIG. 23, the first rail 12A and the second rail 12B have the same shape. The fifth embodiment is the same as the first through fourth embodiments except for the shapes of the front end face 1231 and the rear end face 1232, and thus the description thereof will be omitted.

Here, note that in the rail 12 illustrated in FIGS. 20 through 23, recessed portions 1260 are each formed up to an adjacent end face 123 of the rail 12 as in the first embodiment. However, the recessed portions 1260 are not limited to this, but may each be formed so as not to reach the adjacent end face 123 of the rail 12, as in the second embodiment. Further, a plurality of bolt mounting holes 125 and a plurality of adjustment holes 126 may be alternately formed in the longitudinal direction of the rail 12, as in the third embodiment. In addition, as in the fourth embodiment, a recessed portion 1260 may be formed in the longitudinal direction (X axis direction) of the rail 12 from its front end face 1231 to its rear end face 1232 so as to be recessed from the lower surface 121 toward the upper surface 122 of the rail 12.

Here, in the first embodiment, the carriage 50 using the rollers 53 has been described, but the type of the carriage 50 that can be used is not limited to this. For example, a carriage 520 having four rollers 523 as illustrated in FIGS. 24 and 25 can be used. FIG. 24 is a view illustrating an example of the rail 12 and the carriage 520 when seen from the rear side according to the fifth embodiment. Also, FIG. 25 is a view illustrating an example of the rail 12 and the carriage 520 when seen from the side according to the fifth embodiment. The carriage 520 includes a carriage body 521 that is positioned further above the upper surface 122 of the rail 12 and protrudes in the Y axis direction from the side surfaces 124 of the rail 12. In addition, the carriage 520 is provided with four roller shafts 522 that protrude downward in the Z axis direction from the carriage body 521. The roller shafts 522 are provided two by two across the rail 12. Further, the carriage 520 is provided with four rollers 523, which are rotatably supported on their respective roller shafts 522. The rollers 523 are cylindrical in shape, and the upper and lower edges of each roller 523 are formed with rolling surfaces 5231 that are parallel to the upper and lower rolling surfaces 1241 of the rail 12, respectively. The rollers 523 rotate around the respective roller shafts 522 while the rolling surfaces 5231 are in contact with the rolling surfaces 1241 of the rail 12. That is, one roller 523 is in contact with the two upper and lower rolling surfaces 1241 of the rail 12. Then, the rail 12 is sandwiched by two rollers 523 provided in the Y axis direction. Furthermore, the rail 12 is also sandwiched by two rollers 523 in the same manner at positions apart from each other in the X axis direction.

In such a carriage 520, vibration or sound may be generated when the rollers 523 pass through the connecting portion B2 of the rail 12. That is, if there is a step or a gap in the connecting portion B2 in the case when the rolling surfaces 5231 of the rollers 523 pass through the connecting portion B2, vibration or sound may be generated when the rollers 523 pass through the connecting portion B2. On the other hand, the rail 12 according to the fifth embodiment can reduce the vibration and sound mentioned above.

Here, FIG. 26 is a view illustrating an example of the connecting portion B2 of the rail 12 according to the fifth embodiment. D1 indicates a portion (hereinafter referred to as an upper contact portion D1) where an upper rolling surface of a roller 523 (hereinafter referred to as an upper rolling surface 5231A) is in contact with a rolling surface 1241A on the upper surface 122 side of the rail 12, and D2 indicates a portion (hereinafter referred to as a lower contact portion D2) where a lower rolling surface of the roller 523 (hereinafter referred to as a lower rolling surface 5231B) is in contact with a rolling surface 1241B on the lower surface 121 side of the rail 12. The upper contact portion D1 and the lower contact portion D2 are present at positions shifted in the Z axis direction. In the example illustrated in FIG. 26, the upper contact portion D1 is located on the first rail 12A, and the lower contact portion D2 is located on the second rail 12B. When the carriage 50 moves from the second rail 12B toward the first rail 12A, the connecting portion B2 is formed in an oblique direction with respect to the travel direction of the carriage 50. Therefore, the upper rolling surface 5231A of the roller 523 and the lower rolling surface 5231B located therebelow do not pass through the connecting portion B2 at the same time. As a result, even if sound or vibration is generated when the roller 523 passes through the connecting portion B2, the maximum value of the sound or vibration can be reduced because the sound or vibration is not generated simultaneously at the upper contact portion D1 and the lower contact portion D2.

In addition, for example, even looking at the upper contact portion D1 alone, when it passes through the connecting portion B2, the connecting portion B2 is passed from the upper side toward the lower side of the upper rolling surface 5231A of the roller 523, and thus, even if there is a gap in the connecting portion B2, the upper rolling surface 5231A is restrained from falling into that gap. The same applies to the lower rolling surface 5231B. In this way, vibration and noise can be reduced as compared to the case where the connecting portion B2 is orthogonal to the X axis direction.

As described above, according to the rail 12 of the fifth embodiment, the same effects as those of the rails 12 of the first through fourth embodiments described above can be obtained while reducing vibration and noise.

Sixth Embodiment

Figure 27:
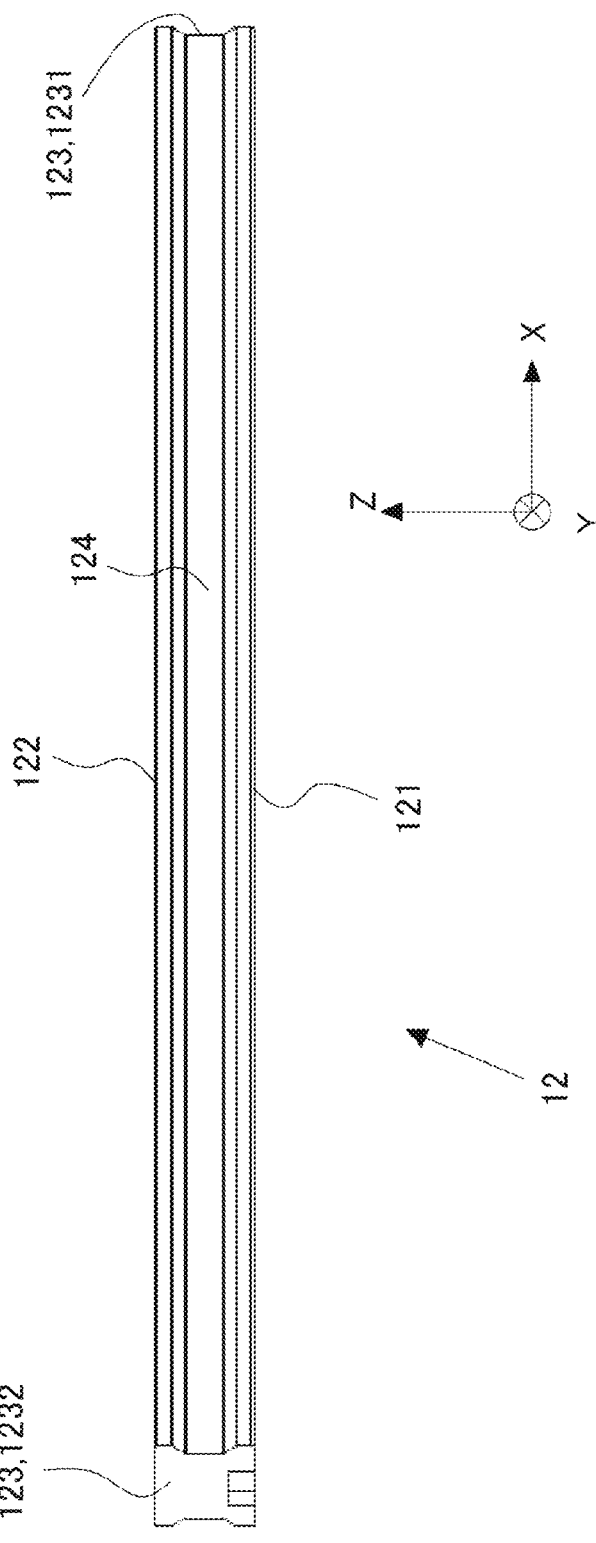
FIG. 27 is a view illustrating an example of a rail as seen from side according to a sixth embodiment.
Figure 28:
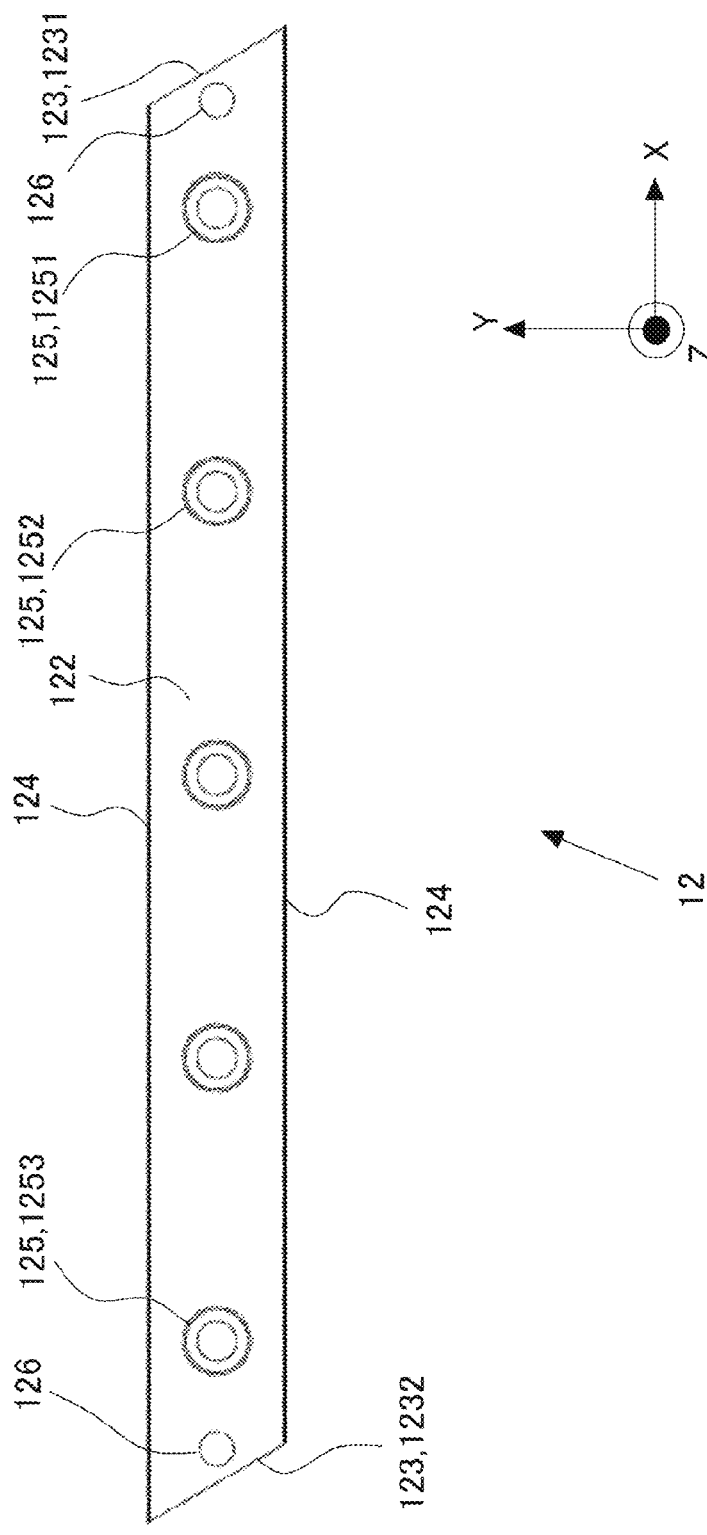
FIG. 28 is a view illustrating an example of the rail when seen from above according to the sixth embodiment.
Figure 29:
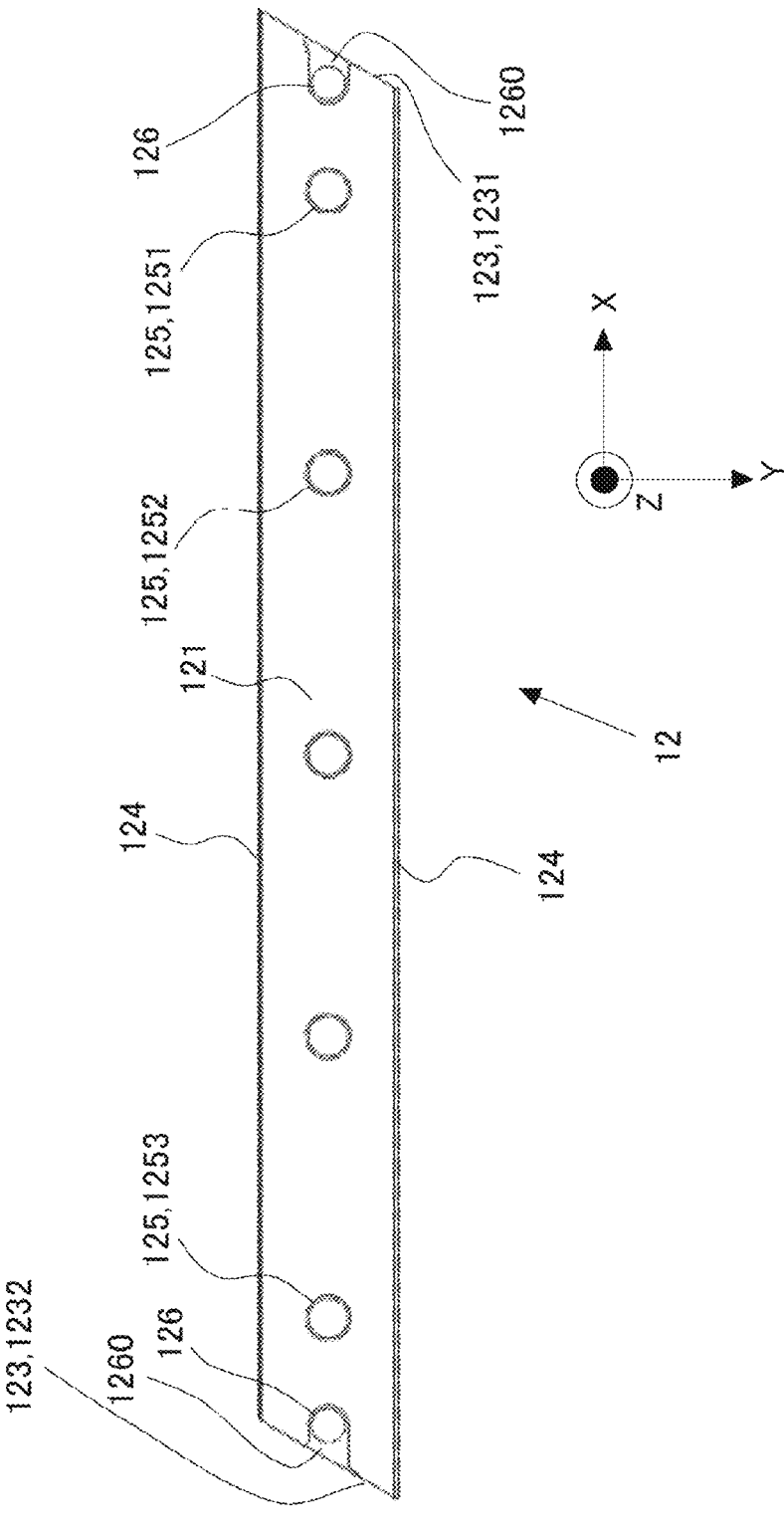
FIG. 29 is a view illustrating an example of the rail when seen from below according to the sixth embodiment.

In this sixth embodiment, end faces 123 are inclined with respect to the X axis direction. In addition, the end faces 123 are also inclined with respect to the Y axis direction and are parallel to the Z axis direction. FIG. 27 is a view illustrating an example of a rail 12 according to the sixth embodiment as seen from the side. FIG. 28 is a view illustrating an example of the rail 12 when seen from above according to the sixth embodiment. FIG. 29 is a view illustrating an example of the rail 12 when seen from below according to the sixth embodiment. FIG. 30 is an example of a perspective view of an upper surface 122 side in a state where a first rail 12A and a second rail 12B according to the sixth embodiment are connected to each other.

The end faces 123 are orthogonal to an upper surface 122 and a lower surface 121 and is inclined with respect to side surfaces 124. For example, a front end face 1231 is formed so as to protrude forward as it goes from a left side surface 124 to a right side surface 124. In addition, a rear end face 1232 is formed so as to protrude rearward as it goes from the right side surface 124 to the left side surface 124. The sixth embodiment is the same as the first through fourth embodiments except for the shapes of the front end face 1231 and the rear end face 1232, and thus the description thereof will be omitted.

Here, note that in the rail 12 illustrated in FIGS. 27 through 30, recessed portions 1260 are each formed up to an adjacent end face 123 of the rail 12 as in the first embodiment. However, the recessed portions 1260 are not limited to this, but may each be formed so as not to reach the adjacent end face 123 of the rail 12, as in the second embodiment. Further, a plurality of bolt mounting holes 125 and a plurality of adjustment holes 126 may be alternately formed in the rail 12 in the longitudinal direction of the rail, as in the third embodiment. In addition, as in the fourth embodiment, a recessed portion 1260 may be formed on the lower surface 121 of the rail 12 so as to be recessed from the lower surface 121 toward the upper surface 122 of the rail 12 in the longitudinal direction (X axis direction) thereof from its front end face 1231 toward its rear end face 1232.

According to the rail 12 of the sixth embodiment, the same effects as those of the rails according to the first through fourth embodiments described above can be obtained. Further, according to the rail 12 of the sixth embodiment, the plurality of rollers 523 illustrated in FIG. 24 and FIG. 25 do not pass through the connecting portion B2 at the same time, thus making it possible to reduce noise and vibration.

DESCRIPTION OF REFERENCE SIGNS

1 . . . guide device, 10A . . . first module, 10B . . . second module, 11A . . . first mounting member, 11B . . . second mounting member, 12A . . . first rail, 12B . . . second rail, 13 . . . mounting bolt, 14 . . . eccentric bolt, 111 . . . mounting surface, 126 . . . adjustment hole, 1261 . . . bolt contact surface

The invention claimed is:

1. A guide device equipped with a mounting member, a rail, and an eccentric part, wherein the rail is fixed to a mounting surface of the mounting member, the rail comprising:

a first surface in contact with the mounting surface;

a second surface opposite the first surface;

a through hole penetrating between the first surface and the second surface; and a recessed portion that is an opening of the through hole on a first surface side and is formed to be recessed from the first surface toward the second surface; wherein the recessed portion includes a third surface that is a surface orthogonal to the first surface and orthogonal to a width direction of the rail;

the recessed portion receives the eccentric part that rotates eccentrically with respect to a reference axis orthogonal to the mounting surface to apply a force to the third surface in the width direction of the rail; and the through hole has a diameter smaller than a length of the recessed portion in the width direction.

2. The guide device according to claim 1, wherein the eccentric part is a head of an eccentric bolt that rotates about the reference axis.

3. The guide device according to claim 1, wherein the recessed portion is formed up to at least one end of the rail.

4. The guide device according to claim 1, wherein the through hole is formed at a location closer to an end of the rail than a mounting hole that is a hole through which a bolt for fixing the rail to the mounting surface passes.

5. The guide device according to claim 1, wherein the through hole is formed between a plurality of mounting holes that are holes through which bolts for fixing the rail to the mounting surface pass.

6. The guide device according to claim 1, wherein an axial end face of the rail is inclined with respect to an axial direction of the rail.

* * * * *